(12) United States Patent
Pettey et al.

(10) Patent No.: US 7,706,372 B2
(45) Date of Patent: Apr. 27, 2010

(54) METHOD AND APPARATUS FOR SHARED I/O IN A LOAD/STORE FABRIC

(75) Inventors: Christopher J. Pettey, Cedar Park, TX (US); Asif Khan, Cedar Park, TX (US); Annette Pagan, Austin, TX (US); Richard E. Pekkala, Austin, TX (US); Robert Haskell Utley, Round Rock, TX (US)

(73) Assignee: NextIO Inc., Austin, TX (US)

( * ) Notice: Subject to any disclaimer, the term of this patent is extended or adjusted under 35 U.S.C. 154(b) by 743 days.

(21) Appl. No.: 11/379,264

(22) Filed: Apr. 19, 2006

(65) Prior Publication Data

US 2007/0025354 A1 Feb. 1, 2007

Related U.S. Application Data

(63) Continuation of application No. 10/757,714, filed on Jan. 14, 2004, now Pat. No. 7,046,668.

(60) Provisional application No. 60/440,788, filed on Jan. 21, 2003, provisional application No. 60/440,789, filed on Jan. 21, 2003, provisional application No. 60/464,382, filed on Apr. 18, 2003, provisional application No. 60/491,314, filed on Jul. 30, 2003, provisional application No. 60/515,558, filed on Oct. 29, 2003, provisional application No. 60/523,522, filed on Nov. 19, 2003.

(51) Int. Cl.
*H04L 12/28* (2006.01)
*H04L 12/56* (2006.01)

(52) U.S. Cl. .................. 370/392; 370/401; 370/465

(58) Field of Classification Search ............. 370/389, 370/392, 401, 471, 465, 466, 467, 419, 463, 370/428
See application file for complete search history.

(56) References Cited

U.S. PATENT DOCUMENTS 4,058,672 A 11/1977 Crager et al.
(Continued)

FOREIGN PATENT DOCUMENTS

EP 0574691 A 12/1993
(Continued)

OTHER PUBLICATIONS

PCI Express Base Specificattion. Rev. 1.0. Apr. 29, 2002.
(Continued)

*Primary Examiner*—Brian D Nguyen
(74) *Attorney, Agent, or Firm*—James W. Huffman

(57) ABSTRACT

An apparatus and method is provided for allowing I/O devices to be shared and/or partitioned among a plurality of processing complexes within the load/store fabric of each of the processing complexes without requiring modification to the operating system or driver software of the processing complexes. The apparatus and method includes a switch for selectively coupling each of the processing complexes to one or more shared I/O devices. The apparatus and method further includes placing information within packets transmitted between the switch and the I/O devices to identify which of the processing complexes the packets are associated with. The invention further includes an apparatus and method within the shared I/O devices to allow the shared I/O devices to service each of the processing complexes independently.

39 Claims, 20 Drawing Sheets

U.S. PATENT DOCUMENTS

| | | | |
|---|---|---|---|
| 5,280,614 A | 1/1994 | Munroe et al. | |
| 5,414,851 A | 5/1995 | Brice, Jr. et al. | |
| 5,581,709 A | 12/1996 | Ito et al. | |
| 5,590,285 A | 12/1996 | Krause et al. | |
| 5,590,301 A * | 12/1996 | Guenthner et al. | 711/202 |
| 5,600,805 A | 2/1997 | Fredericks et al. | |
| 5,623,666 A | 4/1997 | Pike et al. | |
| 5,633,865 A | 5/1997 | Short | |
| 5,758,125 A | 5/1998 | Misinai et al. | |
| 5,761,669 A | 6/1998 | Montague et al. | |
| 5,790,807 A | 8/1998 | Fishler et al. | |
| 5,812,843 A | 9/1998 | Yamazaki et al. | |
| 5,909,564 A | 6/1999 | Alexander et al. | |
| 5,926,833 A | 7/1999 | Rasoulian et al. | |
| 6,009,275 A | 12/1999 | DeKoning et al. | |
| 6,014,669 A | 1/2000 | Slaughter et al. | |
| 6,044,465 A | 3/2000 | Dutcher et al. | |
| 6,055,596 A | 4/2000 | Cepulis | |
| 6,078,964 A | 6/2000 | Ratcliff et al. | |
| 6,112,263 A | 8/2000 | Futral | |
| 6,128,666 A | 10/2000 | Muller et al. | |
| 6,141,707 A | 10/2000 | Halligan et al. | |
| 6,167,052 A | 12/2000 | McNeill et al. | |
| 6,170,025 B1 | 1/2001 | Drottar et al. | |
| 6,240,467 B1 | 5/2001 | Beardsley et al. | |
| 6,247,077 B1 | 6/2001 | Muller et al. | |
| 6,343,324 B1 | 1/2002 | Hubis et al. | |
| 6,421,711 B1 | 7/2002 | Blumenau et al. | |
| 6,484,245 B1 | 11/2002 | Sanada et al. | |
| 6,496,880 B1 | 12/2002 | Ma et al. | |
| 6,507,896 B2 | 1/2003 | Sanada et al. | |
| 6,510,496 B1 | 1/2003 | Tarui et al. | |
| 6,523,096 B2 | 2/2003 | Sanada et al. | |
| 6,535,964 B2 | 3/2003 | Sanada et al. | |
| 6,542,919 B1 | 4/2003 | Wendorf et al. | |
| 6,556,580 B1 | 4/2003 | Wang et al. | |
| 6,615,336 B1 | 9/2003 | Chen et al. | |
| 6,622,153 B1 | 9/2003 | Lee et al. | |
| 6,640,206 B1 | 10/2003 | Callender et al. | |
| 6,662,254 B1 | 12/2003 | Tal et al. | |
| 6,665,304 B2 | 12/2003 | Beck et al. | |
| 6,678,269 B1 | 1/2004 | Michels et al. | |
| 6,728,844 B2 | 4/2004 | Sanada et al. | |
| 6,742,090 B2 | 5/2004 | Sanada et al. | |
| 6,745,281 B1 | 6/2004 | Saegusa | |
| 6,754,755 B1 | 6/2004 | Johnson et al. | |
| 6,760,793 B2 | 7/2004 | Kelley et al. | |
| 6,772,270 B1 | 8/2004 | Kurpanek | |
| 6,779,071 B1 | 8/2004 | Kallat et al. | |
| 6,820,168 B2 | 11/2004 | Tanaka et al. | |
| 6,823,458 B1 | 11/2004 | Lee et al. | |
| 6,834,326 B1 | 12/2004 | Wang et al. | |
| 6,859,825 B1 | 2/2005 | Williams | |
| 6,877,073 B2 | 4/2005 | Sanada et al. | |
| 6,918,060 B2 | 7/2005 | Fanning | |
| 6,944,617 B2 | 9/2005 | Harriman | |
| 6,961,761 B2 | 11/2005 | Masuyama et al. | |
| 7,013,353 B2 | 3/2006 | Parthasarathy et al. | |
| 7,024,510 B2 | 4/2006 | Olarig | |
| 7,082,524 B2 | 7/2006 | Shah | |
| 7,103,064 B2 | 9/2006 | Pettey et al. | |
| 7,136,953 B1 | 11/2006 | Bisson et al. | |
| 7,152,128 B2 | 12/2006 | Wehage et al. | |
| 7,231,486 B2 | 6/2007 | Ajanovic et al. | |
| 7,421,578 B1 | 9/2008 | Huang et al. | |
| 7,457,906 B2 * | 11/2008 | Pettey et al. | 710/316 |
| 7,493,416 B2 | 2/2009 | Pettey | |
| 2001/0032280 A1 | 10/2001 | Osakada et al. | |
| 2002/0026558 A1 | 2/2002 | Reuter et al. | |
| 2002/0027906 A1 | 3/2002 | Athreya et al. | |
| 2002/0029319 A1 | 3/2002 | Robbins et al. | |
| 2002/0052914 A1 | 5/2002 | Zalewski et al. | |
| 2002/0072892 A1 | 6/2002 | Shirley | |
| 2002/0078271 A1 | 6/2002 | Berry | |
| 2002/0099901 A1 | 7/2002 | Tanaka et al. | |
| 2002/0126693 A1 | 9/2002 | Stark et al. | |
| 2002/0172195 A1 | 11/2002 | Pekkala et al. | |
| 2002/0186694 A1 | 12/2002 | Mahajan et al. | |
| 2003/0069975 A1 | 4/2003 | Abjanic et al. | |
| 2003/0069993 A1 | 4/2003 | Na et al. | |
| 2003/0079055 A1 | 4/2003 | Chen | |
| 2003/0091037 A1 | 5/2003 | Latif et al. | |
| 2003/0112805 A1 | 6/2003 | Stanton | |
| 2003/0123484 A1 | 7/2003 | Harriman | |
| 2003/0126202 A1 | 7/2003 | Watt | |
| 2003/0131105 A1 | 7/2003 | Czeiger et al. | |
| 2003/0158992 A1 | 8/2003 | Ajanovic et al. | |
| 2003/0163341 A1 | 8/2003 | Banerjee et al. | |
| 2003/0188060 A1 | 10/2003 | Van Hensbergen | |
| 2003/0200315 A1 | 10/2003 | Goldenberg et al. | |
| 2003/0200330 A1 | 10/2003 | Oelke et al. | |
| 2003/0204593 A1 | 10/2003 | Brown et al. | |
| 2003/0208531 A1 | 11/2003 | Matters et al. | |
| 2003/0208551 A1 | 11/2003 | Matters et al. | |
| 2003/0208631 A1 | 11/2003 | Matters et al. | |
| 2003/0208632 A1 | 11/2003 | Rimmer | |
| 2003/0208633 A1 | 11/2003 | Rimmer | |
| 2003/0212830 A1 | 11/2003 | Greenblat et al. | |
| 2003/0217183 A1 | 11/2003 | Rimmer et al. | |
| 2003/0235204 A1 | 12/2003 | Azevedo et al. | |
| 2004/0003140 A1 | 1/2004 | Rimmer | |
| 2004/0013092 A1 | 1/2004 | Betker et al. | |
| 2004/0013124 A1 * | 1/2004 | Peebles et al. | 370/412 |
| 2004/0019714 A1 | 1/2004 | Kelley et al. | |
| 2004/0019726 A1 | 1/2004 | Kelley et al. | |
| 2004/0019729 A1 | 1/2004 | Kelley et al. | |
| 2004/0025166 A1 | 2/2004 | Adlung et al. | |
| 2004/0054838 A1 | 3/2004 | Hoese et al. | |
| 2004/0068591 A1 | 4/2004 | Workman et al. | |
| 2004/0073712 A1 | 4/2004 | Larson et al. | |
| 2004/0073716 A1 | 4/2004 | Boom et al. | |
| 2004/0081104 A1 | 4/2004 | Pan et al. | |
| 2004/0088414 A1 | 5/2004 | Flynn et al. | |
| 2004/0098532 A1 | 5/2004 | Huang et al. | |
| 2004/0109460 A1 | 6/2004 | Banks et al. | |
| 2004/0109473 A1 | 6/2004 | Lebizay et al. | |
| 2004/0111559 A1 | 6/2004 | Heil | |
| 2004/0116141 A1 | 6/2004 | Loven et al. | |
| 2004/0117516 A1 | 6/2004 | Date | |
| 2004/0117536 A1 * | 6/2004 | Franke et al. | 710/302 |
| 2004/0117598 A1 | 6/2004 | Arimilli et al. | |
| 2004/0123014 A1 | 6/2004 | Schaefer et al. | |
| 2004/0128410 A1 | 7/2004 | Mayhew et al. | |
| 2004/0165588 A1 | 8/2004 | Pandya | |
| 2004/0172494 A1 | 9/2004 | Pettey et al. | |
| 2004/0179529 A1 | 9/2004 | Pettey et al. | |
| 2004/0179534 A1 | 9/2004 | Pettey et al. | |
| 2004/0186942 A1 | 9/2004 | Olarig | |
| 2004/0193737 A1 | 9/2004 | Huffman et al. | |
| 2004/0210678 A1 | 10/2004 | Pettey et al. | |
| 2004/0213211 A1 | 10/2004 | Green | |
| 2004/0221047 A1 | 11/2004 | Grover et al. | |
| 2004/0228280 A1 | 11/2004 | Moore et al. | |
| 2004/0233921 A1 | 11/2004 | Krieg et al. | |
| 2004/0249975 A1 | 12/2004 | Tuck et al. | |
| 2004/0260842 A1 | 12/2004 | Pettey et al. | |
| 2004/0268015 A1 | 12/2004 | Pettey et al. | |
| 2005/0025119 A1 | 2/2005 | Pettey et al. | |
| 2005/0027900 A1 | 2/2005 | Pettey | |
| 2005/0050240 A1 | 3/2005 | Wilkins et al. | |
| 2005/0053060 A1 | 3/2005 | Pettey | |
| 2005/0080982 A1 | 4/2005 | Vasilevsky et al. | |
| 2005/0097271 A1 | 5/2005 | Davies et al. | |
| 2005/0102437 A1 | 5/2005 | Pettey et al. | |

| | | | |
|---|---|---|---|
| 2005/0114623 A1 | 5/2005 | Craddock et al. |
| 2005/0147117 A1 | 7/2005 | Pettey et al. |
| 2005/0157725 A1 | 7/2005 | Pettey |
| 2005/0157754 A1 | 7/2005 | Pettey |
| 2005/0169258 A1 | 8/2005 | Millet et al. |
| 2005/0172041 A1 | 8/2005 | Pettey |
| 2005/0172047 A1 | 8/2005 | Pettey |
| 2005/0268137 A1 | 12/2005 | Pettey |
| 2006/0018341 A1 | 1/2006 | Pettey et al. |
| 2006/0018342 A1 | 1/2006 | Pettey et al. |
| 2006/0092928 A1 | 5/2006 | Pike et al. |
| 2006/0184711 A1 | 8/2006 | Pettey et al. |

FOREIGN PATENT DOCUMENTS

| | | |
|---|---|---|
| EP | 0935200 A1 | 11/1999 |
| EP | 1115064 A2 | 7/2001 |
| EP | 1376932 A2 | 1/2004 |
| JP | 2002084311 A | 3/2002 |
| JP | 2002183102 A | 6/2002 |
| TW | 545015 | 8/2003 |
| WO | WO9419749 A1 | 1/1994 |
| WO | WO9929071 A1 | 8/2000 |
| WO | WO03085535 A2 | 10/2003 |

OTHER PUBLICATIONS

Cohen et al. "PCI Express Architecture Power Management." Rev 1.1. Nov. 8, 2002.
"Network Interface Controller." FOLDOC—Free On-Line Dictionary of Computing. Http://foldoc.org/index.cgi?query=network+interface+controller. Apr. 11, 2008.
PCI-SIG, PCI Local Bus Specification. Dec. 18, 1998. Revision 2.2, pp. 189-220. http://www.pcisig.com/home.
Koellner, Gregory. "NPIV Functionality Profile." Presentation, Jun. 5, 2002. Presentation # T11/02-340v0. Text # T11/02-338v0. www.t11.org.
INCITS working draft proporsed American National Standard for Information Technology, Fibre Channel Framing and Signaling-2 (FC-FS-2). Jan. 16, 2004. Rev. 0.05. pp. i, 65, 67, 76, 80. http://www.t11.org/index.html.
PCI-SIG, PCI Local Bus Specification. Dec. 18, 1998. Revision 2.2, pp. 214-220. http://www.pcisig.com/home.
PCI-SIG, PCI Express Base Specification. Apr. 15, 2003. Revision 1.0a. pp. 27, 259-260. http://www.pcisig.com/home.
Kleiman et al. "SunOS on SPARC." (abstract only) Publication Date: Feb. 29-Mar. 3, 1988.
Mellanox Technologies, Inc. "Understanding PCI Bus, PCI-Express and Infiniband Architecture (White Paper)." Document No. 2006WP. Mellanox Technologies, Inc. Santa Clara, CA, US.
Dugan et al. "N Port ID Virtualization." Nov. 29, 2001. Document No. 01-627v0. IBM Corporation. http://www.t11.org.
Dugan et al. "N_Port Virtualization: Proposed FC-FS Modifications." Jan. 19, 2002. Document No. 02-008v0. IBM Corporation. http://www.t11.org.
American National Standards Institute. "Fibre Channel—Framing and Signaling (FC-FS)." ANSI/INCITS Standard 373-2003. Oct. 22, 2003. pp. 307 and 311. American National Standards Institute, Inc. New York, NY, USA.
Solomon et al.: "Advanced Switching Architecture", XP002328190. Intel Developer Forum. Sep. 17, 2003. pp. 32-54. Retrieved from the Internet: URL:http://www.asi-sig.org/education/AS_Architecture_and_PI-8_Overview_-_Spring_IDF_2004_FINAL.pdf.
"Xilinx, Designing Network Attached Storage Platform With Advanced Switching" (XP002328191). Sep. 16, 2003. Retrieved from the Internet: URL:http://www.asi-sig.org/education/usage/xilinx_storage_usage.pdf.
Karin S. Puranik: "Advanced Switching Extends PCI Express" XCELL Journal, (XP002328192). Retrieved from the Internet: URL:www.xilinx.com/publications/xcellonline/xcell_47/xc_pdf/xc_pcix47.pdf.
Anonymous: "Fabrics and Application Characteristics for AdvancedTCA Architectures" Intel Technology Journal, vol. 7, No. 4, Nov. 14, 2003 (XP002328193), ISSN: 1535-864X. Retrieved from the Internet: URL:www.intel.com/technology/itj/2003/volume07issue04/art02_fabrics/vol7iss4art02.pdf.
David Mayhew et al. "PCI Express and Advanced Switching: Evolutionary Path to Building Next Generation Interconnects" High Performance Interconnects, 2003. Proceedings. 11TH Symposium on Aug. 20-22, 2003, Piscataway, NJ, USA. IEEE, Aug. 20, 2003, pp. 21-29, (XP010657970). ISBN: 0-7695-2012-X.
Marek Piekarski. "Advanced Switching Interconnect and Blade Server Re-Purposing in the Data Center." Aug. 21, 2004. XP002341367. URL: http://www.asi-sig.org/education/white_papers/ASWhitePaper_Final_Copy.pdf.
Ajay V Bhatt. "Creating a Third Generation I/O Interconnect" Jun. 4, 2003 Intel, XP002354597 http://www.intel.com/technology/pciexpress/downloads/3rdGenWhitePaper.pdf retrieved on Nov. 15, 2005.
"PCI Express Base Specification." Revision 1.0. PCI-SIG. Apr. 29, 2002. pp. 17-18.
Mehta, Pranav. "Advanced Switching boosts PCI Express." EE Times. CommsDesign. Online Oct. 28, 2002. Retrieved from Internet Nov. 30, 2005. <http://www.commsdesign.com/design_corner/showArticle.jhtml?articleID=16505864>.
Forouzan, Behrouz A. "Data Communications and Networking, Third Edition." pp. 528-536. McGraw-Hill, 2004, 2001, 1998.
Seifert, Rich. "The Switch Book, The Complete Guide to LAN Switching Technology." pp. 431-473. John Wiley & Sons. 2000.
"Catalyst 3550 Multilayer Switch Software Configuration Guide." Chapter 13, pp. 1-14. Cisco Systems. Apr. 2002.
"802.1Q, IEEE Standards for Local and Metropolitan Area Networks, Virtual Bridged Local Area Networks." IEEE. May 7, 2003.
Holland et al. "Dynamic Switching between One-to-Many Download Methods I "ALL-IP" Cellular Networks" (abstract only) Publication date: May-Jun. 2006.

* cited by examiner

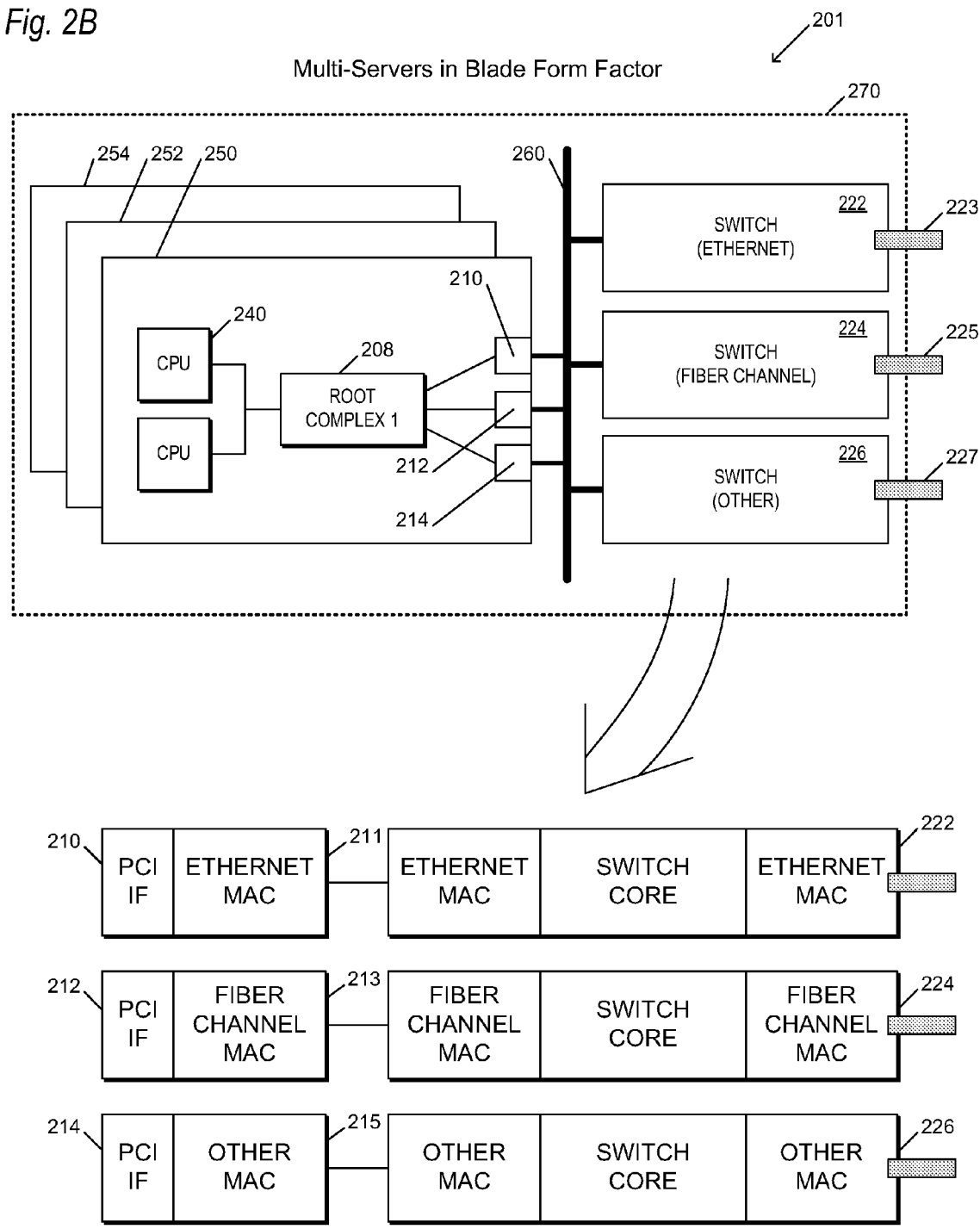

PI  Protocol ID Field
OSD  OS Domain Number
RN  Resource Number (which buffer the packet belongs to)
R  reserved

METHOD AND APPARATUS FOR SHARED I/O IN A LOAD/STORE FABRIC

CROSS REFERENCE TO RELATED APPLICATION(S)

This application is a continuation of U.S. patent application Ser. No. 10/757,714, filed Jan. 14, 2004, which in turn claims the benefit of the following U.S. Provisional Applications:

| Ser. No. | Filing Date | Title |
| --- | --- | --- |
| 60/440,788 (NEXTIO.0101) | Jan. 21, 2003 | SHARED IO ARCHITECTURE |
| 60/440,789 (NEXTIO.0102) | Jan. 21, 2003 | 3GIO-XAUI COMBINED SWITCH |
| 60/464,382 (NEXTIO.0103) | Apr. 18, 2003 | SHARED-IO PCI COMPLIANT SWITCH |
| 60/491,314 (NEXTIO.0104) | Jul. 30, 2003 | SHARED NIC BLOCK DIAGRAM |
| 60/515,558 (NEXTIO.0105) | Oct. 29, 2003 | NEXSIS |
| 62/523,522 (NEXTIO.0106) | Nov. 19, 2003 | SWITCH FOR SHARED I/O FABRIC |

FIELD OF THE INVENTION

This invention relates in general to the field of computer network architecture, and more specifically to an architecture to allow sharing and/or partitioning of network input/output (I/O) endpoint devices in a load/store fabric.

BACKGROUND OF THE INVENTION

Modern computer architecture may be viewed as having three distinct subsystems which when combined, form what most think of when they hear the term computer. These subsystems are: 1) a processing complex; 2) an interface between the processing complex and I/O controllers or devices; and 3) the I/O (i.e., input/output) controllers or devices themselves.

A processing complex may be as simple as a single microprocessor, such as a Pentium microprocessor, coupled to memory. Or, it might be as complex as two or more processors which share memory.

The interface between the processing complex and I/O is commonly known as the chipset. On the north side of the chipset (i.e., between the processing complex and the chipset) is a bus referred to as the HOST bus. The HOST bus is usually a proprietary bus designed to interface to memory, to one or more microprocessors within the processing complex, and to the chipset. On the south side of the chipset are a number of buses which connect the chipset to I/O devices. Examples of such buses include: ISA, EISA, PCI, PCI-X, and AGP.

I/O devices are devices that allow data to be transferred to or from the processing complex through the chipset, on one or more of the busses supported by the chipset. Examples of I/O devices include: graphics cards coupled to a computer display; disk controllers (which are coupled to hard disk drives or other data storage systems); network controllers (to interface to networks such as Ethernet); USB and Firewire controllers which interface to a variety of devices from digital cameras to external data storage to digital music systems, etc.; and PS/2 controllers for interfacing to keyboards/mice. The I/O devices are designed to connect to the chipset via one of its supported interface buses. For example, modern computers typically couple graphic cards to the chipset via an AGP bus. Ethernet cards, SATA, Fiber Channel, and SCSI (data storage) cards, USB and Firewire controllers all connect to a PCI bus, and PS/2 devices connect to an ISA bus.

One skilled in the art will appreciate that the above description is general. What should be appreciated however, is that regardless of the type of computer, it will include a processing complex for executing instructions, an interface to I/O, and I/O devices to allow the processing complex to communicate with the world outside of itself. This is true whether the computer is an inexpensive desktop in a home, a high-end workstation used for graphics and video editing, or a clustered server which provides database support to hundreds within a large organization.

A problem that has been recognized by the present inventors is that the requirement to place a processing complex, interface and I/O within every computer is costly, and lacks modularity. That is, once a computer is purchased, all of the subsystems are static from the standpoint of the user. The ability to change a processing complex while still utilizing the interface and I/O is extremely difficult. The interface or chipset is typically so tied to the processing complex that swapping one without the other doesn't make sense. And, the I/O is typically integrated within the computer, at least for servers and business desktops, such that upgrade or modification of the I/O is either impossible or cost prohibitive.

An example of the above limitations is considered helpful. A popular network server designed by Dell Computer Corporation is the Dell PowerEdge 1750. This server includes a microprocessor designed by Intel (a Xeon processor), along with memory (e.g., the processing complex). It has a server class chipset for interfacing the processing complex to I/O (e.g., the interface). And, it has onboard graphics for connecting to a display, onboard PS/2 for connecting a mouse/keyboard, onboard RAID control for connecting to data storage, onboard network interface controllers for connecting to 10/100 and 1 gig Ethernet; and a PCI bus for adding other I/O such as SCSI or Fiber Channel controllers. It is believed that none of the onboard features are upgradeable.

So, as mentioned above, one of the problems with this architecture is that if another I/O demand emerges, it is difficult, or cost prohibitive to implement the upgrade. For example, 10 gigabit Ethernet is on the horizon. How can this be easily added to this server? Well, perhaps a 10 gig Ethernet controller could be purchased and inserted onto the PCI bus. Consider a technology infrastructure that included tens or hundreds of these servers. To move to a faster network architecture requires an upgrade to each of the existing servers. This is an extremely cost prohibitive scenario, which is why it is very difficult to upgrade existing network infrastructures.

This one-to-one correspondence between the processing complex, the interface, and the I/O is also costly to the manufacturer. That is, in the example above, much of the I/O is manufactured on the motherboard of the server. To include the I/O on the motherboard is costly to the manufacturer, and ultimately to the end user. If the end user utilizes all of the I/O provided, then s/he is happy. But, if the end user does not wish to utilize the onboard RAID, or the 10/100 Ethernet, then s/he is still required to pay for its inclusion. This is not optimal.

Consider another emerging platform, the blade server. A blade server is essentially a processing complex, an interface, and I/O together on a relatively small printed circuit board that has a backplane connector. The blade is made to be inserted with other blades into a chassis that has a form factor similar to a rack server today. The benefit is that many blades can be located in the same rack space previously required by just one or two rack servers. While blades have seen market growth in some areas, where processing density is a real issue, they have yet to gain significant market share, for many reasons. One of the reasons is cost. That is, blade servers still must provide all of the features of a pedestal or rack server, including a processing complex, an interface to I/O, and I/O. Further, the blade servers must integrate all necessary I/O because they do not have an external bus which would allow them to add other I/O on to them. So, each blade must include such I/O as Ethernet (10/100, and/or 1gig), and data storage control (SCSI, Fiber Channel, etc.).

One recent development to try and allow multiple processing complexes to separate themselves from I/O devices was introduced by Intel and other vendors. It is called Infiniband. Infiniband is a high-speed serial interconnect designed to provide for multiple, out of the box interconnects. However, it is a switched, channel-based architecture that is not part of the load-store architecture of the processing complex. That is, it uses message passing where the processing complex communicates with a Host-Channel-Adapter (HCA) which then communicates with all downstream devices, such as I/O devices. It is the HCA that handles all the transport to the Infiniband fabric rather than the processing complex. That is, the only device that is within the load/store domain of the processing complex is the HCA. What this means is that you have to leave the processing complex domain to get to your I/O devices. This jump out of processing complex domain (the load/store domain) is one of the things that contributed to Infinibands failure as a solution to shared I/O. According to one industry analyst referring to Infiniband, "[i]t was overbilled, overhyped to be the nirvana for everything server, everything I/O, the solution to every problem you can imagine in the data center . . . but turned out to be more complex and expensive to deploy . . . because it required installing a new cabling system and significant investments in yet another switched high speed serial interconnect".

Thus, the inventors have recognized that separation between the processing complex and its interface, and I/O, should occur, but the separation must not impact either existing operating systems, software, or existing hardware or hardware infrastructures. By breaking apart the processing complex from the I/O, more cost effective and flexible solutions can be introduced.

Further, the inventors have recognized that the solution must not be a channel based architecture, performed outside of the box. Rather, the solution should use a load-store architecture, where the processing complex sends data directly to (or at least architecturally directly) or receives data directly from an I/O device (such as a network controller, or data storage controller) without message passing. This allows the separation to be accomplished without affecting a network infrastructure or disrupting the operating system.

Therefore, what is needed is an apparatus and method which separates the processing complex and its interface to I/O from the I/O devices.

Further, what is needed is an apparatus and method which allows processing complexes and their interfaces to be designed, manufactured, and sold, without requiring I/O to be included within them.

Additionally, what is needed is an apparatus and method which allows a single I/O device to be shared by multiple processing complexes.

In addition, what is needed is an I/O device that can be shared by two or more processing complexes using a common load-store fabric.

Further, what is needed is an apparatus and method that allows multiple processing complexes to share one or more I/O devices through a common load-store fabric.

Additionally, what is needed is an apparatus and method that provides switching between multiple processing complexes and shared I/O.

Further, what is needed is an apparatus and method that allows multiple processing complexes, each operating independently, and having their own operating system domain, to view shared I/O devices as if the I/O devices were dedicated to them.

And, what is needed is an apparatus and method which allows shared I/O devices to be utilized by different processing complexes without requiring modification to the processing complexes existing operating systems or other software.

SUMMARY

The present invention provides a method and apparatus for separating processing complexes from dedicated I/O devices to allow multiple processing complexes to share I/O devices.

In one aspect, the present invention provides a packet for transferring data in a load/store fabric, to a shared input/output (I/O) endpoint. The packet includes a header field and an OS Domain header field. The header field is for identifying the shared I/O endpoint. The OS Domain header field is coupled to the header field, and is for identifying which one of a plurality of root complexes is associated with the packet.

In another aspect, the present invention provides an OS Domain header, within a PCI Express Packet. The OS Domain header includes a plurality of bit fields that define an operating system domain from which the PCI Express Packet originated.

In a further aspect, the present invention provides a method for identifying a root complex for a packet within a load/store fabric to allow for sharing input/output (I/O) endpoints. The method includes providing an architecture for the packet, and providing a field for inclusion in the packet to identify the root complex for the packet. The input/output (I/O) endpoints utilize the field to identify the root complex for the packet.

In another aspect, the present invention provides a method for transferring a packet from a shared input/output (I/O) endpoint to one of a plurality of OS Domains, within a load/store fabric. The method includes: embedding an OS Domain number with the packet to associate the packet with one of the plurality of OS Domains; transferring the packet with the embedded OS Domain number to a shared I/O switch; examining the embedded OS Domain number to determine a port within the shared I/O switch associated with the one of the plurality of OS Domains; and transferring the packet to the one of the plurality of OS Domains using the port.

In a further aspect, the present invention provides a shared input/output (I/O) fabric within a load/store domain. The fabric includes a plurality of root complexes, a shared I/O switch coupled to the plurality of root complexes, and a shared I/O controller, coupled to the shared I/O switch. The shared I/O switch receives packets from each of the plurality of root complexes, places root complex identification within the packets for use by the shared I/O controller, and transmits the packets with the root complex identification to the shared I/O controller for processing.

In yet another aspect, the present invention provides a serial communication architecture between a plurality of root complexes and a plurality of endpoints. The architecture allows each of the plurality of root complexes to share each of the plurality of endpoints. The architecture includes a first link and a second link. The first link is between each of the plurality of root complexes and a shared I/O switch. The second link is between the shared I/O switch and each of the plurality of endpoints. The shared I/O switch associates packets from the plurality of root complexes with the root complexes by embedding a header within the packets before transmitting the packets to the plurality of endpoints.

In yet another aspect, the present invention provides an apparatus for associating packets in a load/store serial communication fabric with root complexes to allow the root complexes to share an input/output (I/O) endpoint. The apparatus includes a shared I/O switch and a link. The shared I/O switch is coupled to each of the root complexes and has routing control to associate the packets from each of the root complexes with the root complex they originate from by incorporating a field within the packets. The link is between the shared I/O switch and the input/output (I/O) endpoint. The link allows the packets to be transferred from the shared I/O switch to the input/output (I/O) endpoint with the field. The input/output (I/O) endpoint associates the packets with their associated root complexes by examining the field.

In a further aspect, the present invention provides a method for associating packets, within a serial load/store fabric, from a plurality of root complexes with their originating root complex, to allow the plurality of root complexes to share an I/O endpoint. The method includes providing a first link between the plurality of root complexes and a switch, the packets in the first link unaware that the root complexes are sharing the I/O endpoint, within the switch, embedding a header in the packets to associate the packets with their originating root complex, providing a second link between the switch and the I/O endpoint, the second link capable of communicating the packets with the embedded header between the switch and the I/O endpoint, and at the I/O endpoint, examining the packets with the embedded header to allow the I/O endpoint to associate each of the packets with their originating root complex.

In yet another aspect, the present invention provides an Ethernet controller which processes packets received from a plurality of network computer servers via a serial load/store fabric. The Ethernet controller includes a bus interface and control register logic. The bus interface is coupled to the serial load/store fabric, and associates each of the packets with their originating network computer server. The control register logic, has a plurality of control registers, where each of the plurality of control registers is selectable to service at least one of the network computer servers based on the association of the packets with their originating network computer server.

A further aspect of the present invention provides a shared data storage controller for accessing network data storage from a plurality of root complexes via a common load/store link. The controller includes a plurality of resources and a bus interface. Each of the plurality of resources are allocated to a particular one of the plurality of root complexes. The bus interface is coupled to the common load/store link and the plurality of resources, to receive packets from the plurality of root complexes and to select a particular one of the plurality of resources to be used for packet processing based on the allocation.

In another aspect, the present invention provides an apparatus to allow a first computer and a second computer to share an Ethernet network interface controller utilizing a serial load/store fabric. The apparatus includes a shared I/O switch, a first link, a second link, a third link, and an interface for the Ethernet network interface controller. The first link couples the first computer to the shared I/O switch. The second link couples the second computer to the shared I/O switch. The third link couples the shared I/O switch to the Ethernet network interface controller, the third link utilizing the serial load/store fabric to pass packets originating from both the first computer and the second computer to the Ethernet network interface controller. The packets have header information which associates each of the packets with either the first computer or the second computer. The interface for the Ethernet network interface controller examines the packets, including the header information, for selecting dedicated resources for the packets based on the association.

In a further aspect, the present invention provides a method to allow at least two root complexes to share an endpoint device within a serial load/store fabric. The method includes: identifying packets from the at least two root complexes with header information to associate the packets with the at least two root complexes; transmitting the packets from the at least two root complexes to the endpoint device; at the endpoint device, examining the packets to determine which of the at least two root complexes that are associated with; allocating resources for the packets based on the association; and processing the packets according to said step of allocating.

Other features and advantages of the present invention will become apparent upon study of the remaining portions of the specification and drawings.

BRIEF DESCRIPTION OF THE DRAWINGS

FIG. 2B is an architectural diagram of a computer network of three servers each connected to three different fabrics within a blade form factor.

DETAILED DESCRIPTION

Figure 1:
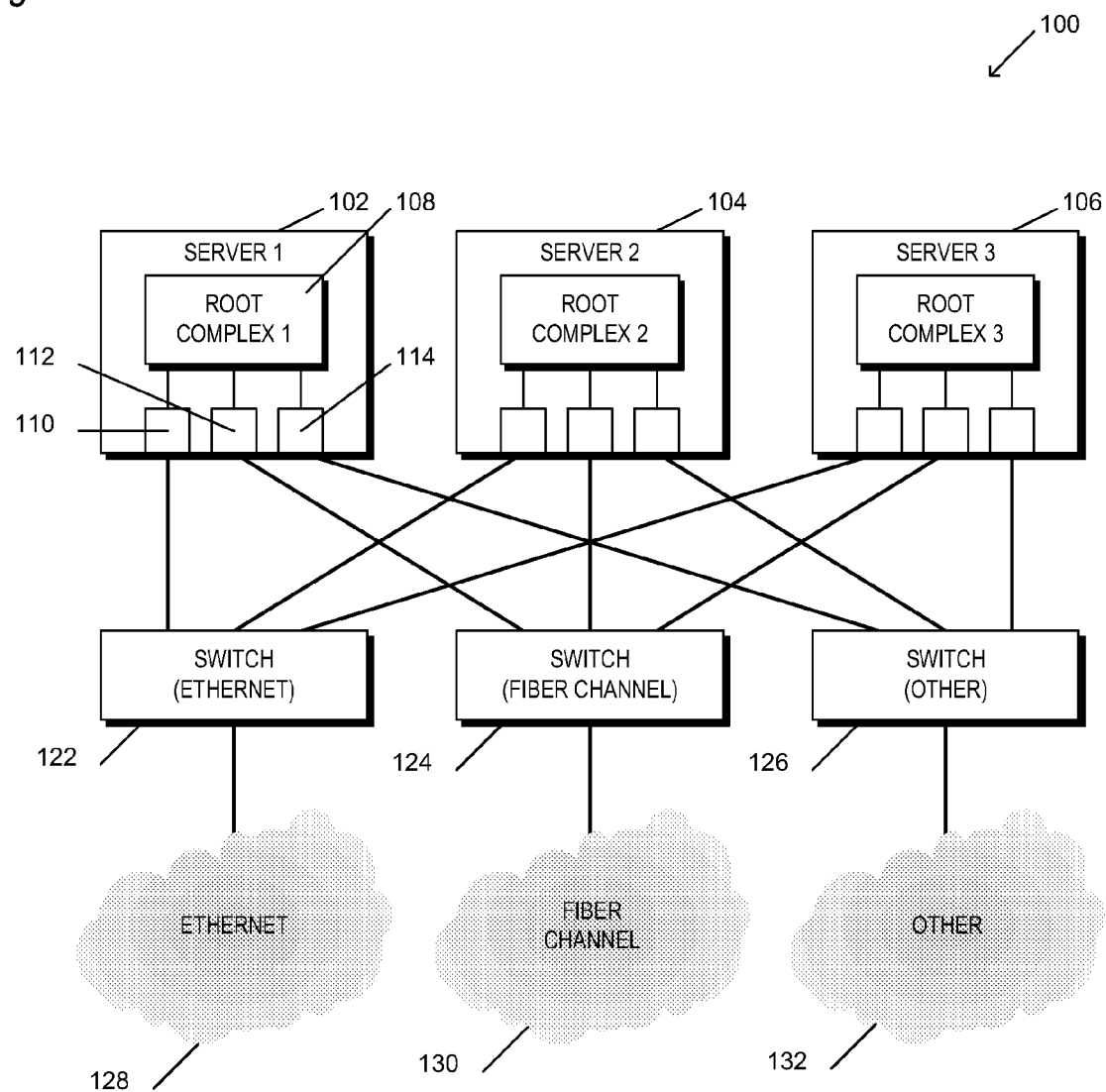
FIG. 1 is an architectural diagram of a computer network of three servers each connected to three different fabrics.

Referring to FIG. 1, a block diagram 100 is shown of a multi-server computing environment. The environment includes three servers 102, 104 and 106. For purposes of this application, a server is a combination of hardware and software that provides services to computer programs in the same or other computers. Examples of computer servers are computers manufactured by Dell, Hewlett Packard, Apple, Sun, etc. executing operating systems such as Windows, Linux, Solaris, Novell, MAC OS, Unix, etc., each having one or more processors manufactured by companies such as Intel, AMD, IBM, Sun, etc.

Each of the servers 102, 104, 106 has a root complex 108. The root complex typically is the chip set which provides the interface between a processing complex (one or more CPU's which share a common memory and execute a common operating system), memory, and downstream I/O (e.g., IDE, SATA, Infiniband, Ethernet, Fiber Channel, USB, Firewire, PS/2). However, in the context of the present invention, the root complex may also include one or more processing complexes (processors+memory) as well as the other functions described above. Further, a root complex may include multiple processing complexes executing the same or different operating systems. For example, future processors may be designed which have multiple cores, each of which are independent of the other (i.e., each having its own memory structure and executing its own operating system). Within the context of PCI Express (which will be further discussed below), a root complex is a component in a PCI Express hierarchy that connects to the HOST bus segment on the upstream side with one or more PCI Express links on the downstream side. The present invention envisions all of these definitions for the term root complex.

The root complex 108 of each of the servers 102, 104, 106 is connected to three I/O controllers 110, 112, 114. For illustration purposes, the I/O controllers are a Network Interface Controller (NIC) 110, a Fiber Channel Controller 112, and an Other Controller 114. The three controllers 110, 112, 114 allow the root complex 108 of each of the servers 102, 104, 106 to communicate with networks, and data storage systems such as the Ethernet network 128, the Fiber Channel network 130 and the Other network 132. One skilled in the art will appreciate that these networks 128, 130 and 132 may reside within a physical location close in proximity to the servers 102, 104, 106, or may extend to points anywhere in the world, subject to limitations of the network.

To allow each of the servers 102, 104, 106 to connect to the networks 128, 130, 132, switches 122, 124, 126 are provided between the controllers 110, 112, 114 in each of the servers 102, 104, 106, and the networks 128, 130, 132, respectively. That is, an Ethernet switch 122 is connected to the Network Interface Controllers 110 in each of the servers 102, 104, 106, and to the Ethernet network 128. The Ethernet switch 122 allows data or instructions to be transmitted from any device on the Ethernet network 128 to any of the three servers 102, 104, 106, and vice versa. Thus, whatever the communication channel between the root complex 108 and the Network Interface controller 110 (e.g., ISA, EISA, PCI, PCI-X, PCI Express), the Network Interface controller 110 communicates with the Ethernet network 128 (and the Switch 122) utilizing the Ethernet protocol. One skilled in the art, however, will appreciate that the communication channel between the root complex 108 and the network interface controller 110 is still part of the load/store fabric of the root complex 108.

A Fiber Channel switch 124 is connected to the Fiber Channel controllers 112 in each of the servers 102, 104, 106, and to the Fiber Channel network 130. The Fiber Channel switch 124 allows data or instructions to be transmitted from any device on the Fiber Channel network 130 to any of the three servers 102, 104, 106, and vice versa.

An Other switch 126 is connected to the Other controllers 114 in each of the servers 102, 104, 106, and to the Other network 132. The Other switch 126 allows data or instructions to be transmitted from any device on the Other network 132 to any of the three servers 102, 104, 106, and vice versa. Examples of Other types of networks include: Infiniband, SATA, Serial Attached SCSI, etc. While the above list is not exhaustive, the Other network 132 is illustrated herein to help the reader understand that what will ultimately be described below with respect to the present invention, should not be limited to Ethernet and Fiber Channel networks 128, 130, but rather, can easily be extended to networks that exist today, or that will be defined in the future. Further, the communication speeds of the networks 128, 130, 132 are not discussed because one skilled in the art will appreciate that the interface speed of any network may change over time while still utilizing a preexisting protocol.

To illustrate the operation of the environment 100, if the server 102 wishes to send data or instructions over the Ethernet network 128 to either of the servers 104, 106, or to another device (not shown) on the Ethernet network 128, the root complex 108 of the server 102 will utilize its Ethernet controller 110 to send the data or instructions to the Ethernet switch 122 which will then pass the data or instructions to the other server(s) 104, 106 or to a router (not shown) to get to an external device. One skilled in the art will appreciate that any device connected to the Ethernet network 128 will have its own Network Interface controller 110 to allow its root complex to communicate with the Ethernet network.

The inventor(s) of the present application have provided the above discussion (with respect to FIG. 1) to illustrate that modern computers communicate with each other, and to other computers or devices, using a variety of communication channels or networks. And, when more than one computer resides within a particular location, a switch is typically used for each network type to interconnect those computers to each other, and to the network. Further the connection between a computer and the switch (or the network) is provided within the computer. In this instance, the servers 102, 104, 106 each have a Network Interface controller 110 to connect them to an Ethernet switch 122. They also have a Fiber Channel controller 112 connected to a Fiber Channel switch 124. And, they have an Other controller 114 to connect them to an Other switch 126. Thus, each computer is required to include a controller for each type of network it desires to communicate with, to allow its root complex to communicate with that network. This allows differing types of root complexes, executing different operating systems, or a root complex executing multiple operating systems, to communicate with each other because they all have controllers specific to them that know how to communicate over the desired network.

Figure 2A:
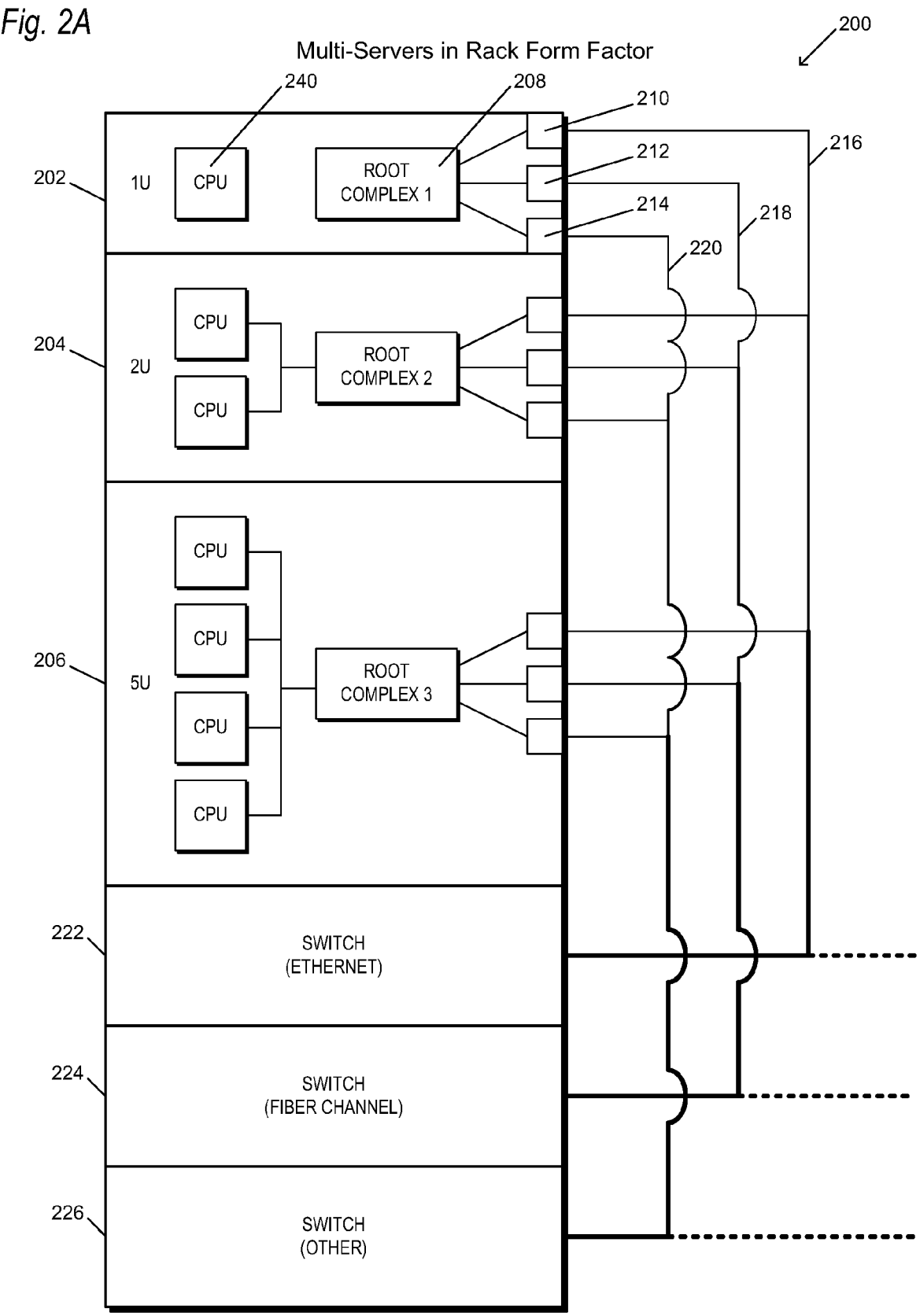
FIG. 2A is an architectural diagram of a computer network of three servers each connected to three different fabrics within a rack form factor.

Referring now to FIG. 2A, a diagram is shown of a multi-server environment 200 similar to the one discussed above with respect to FIG. 1. More specifically, the environment 200 includes three servers 202, 204, 206 each having a root complex 208 and three controllers 210, 212, 214 to allow the servers 202, 204, 206 to connect to an Ethernet switch 222, a Fiber Channel switch 224 and an Other switch 226. However, at least three additional pieces of information are presented in FIG. 2.

First, it should be appreciated that each of the servers 202, 204, 206 is shown with differing numbers of processors or CPU's. Server 202 contains one CPU 240. Server 204 contains two CPU's. Server 206 contains four CPU's. Second, the form factor for each of the servers 202, 204, 206 is approximately the same width, but differing height, to allow servers with different computing capacities and operating systems to physically reside within the same rack or enclosure. Third, the switches 222, 224, 226 also have form factors that allow them to be located within the same rack or enclosure as the servers 202, 204, 206. One skilled in the art will appreciate that as in FIG. 1, each of the servers 202, 204, 206 must include within their form factor, a controller 210, 212, 214 for each network they desire to communicate with.

Referring now to FIG. 2B, a computing environment 201 is shown. The computing environment 201 is similar to those discussed above with respect to FIGS. 1 and 2A, however, the servers 250, 252, 254 are placed physically on a single computer board in a form factor known as a blade or a blade server. A blade server is a thin, modular electronic circuit board, containing one, two, or more microprocessors and memory, that is usually intended for a single, dedicated application (such as serving Web pages) and that can be easily inserted into a space-saving rack with many similar servers. Blade Servers make it possible to install hundreds of blade servers vertically in multiple racks or rows of a single floor-standing cabinet. Blade servers, which share a common high-speed bus, are designed to create less heat and thus save energy costs as well as space. Large data centers and Internet service providers (ISPs) that host Web sites are among companies that use blade servers. A blade server is sometimes referred to as a high-density server and is typically used in a clustering of servers that are dedicated to a single task, such as: file sharing, Web page serving and caching, SSL encrypting of Web communication, transcoding of Web page content for smaller displays, Streaming audio and video content, scientific computing, financial modeling, etc. Like most clustering applications, blade servers can also be managed to include load balancing and failover capabilities. A blade server usually comes with an operating system and the application program to which it is dedicated already on board. Individual blade servers come in various heights, including 5.25 inches (the 3U model), 1.75 inches (1U), and possibly "sub-U" sizes. (A U is a standard measure of vertical height in an equipment cabinet and is equal to 1.75 inches.)

In the environment 201 of FIG. 2B, each of the blade servers 250, 252, 254 have a CPU (or number of CPU's) 240, a root complex 208, and interface controllers 210, 212, and 214. The servers 250, 252, 254 are meant to operate within a blade chassis 270 which provides power to the blade servers 250, 252, 254, as well as a backplane interface 260 to all the servers 250, 252, 254 to communicate with networks 223, 225, 227 via switches 222, 224, 226. In today's blade server market, the switches 222, 224, 226 have a form factor similar to that of the blade servers 250, 252, 254 for insertion into the blade chassis 270.

In addition to showing the servers 250, 252, 254 in a blade form factor, with the switches 222, 224, 226 within a blade chassis 270, the inventor(s) wish to show that each of the controllers 210, 212, 214 require an interface to the root complex 208, and Media Access Control (MAC) 211, 213, 215, respectively. The MAC for each of the interface controllers 210, 212, 214 typically resides one layer above the physical layer and defines the absolute address of its controller. Corresponding MAC's are also required on every port of the switches 222, 224, 226 to allow proper routing of data and/or instructions (i.e., usually in packet form) from one port (or device) to another. Thus, within a blade server environment, a controller must be supplied on each blade server, for each network it wishes to communicate with. And each controller must include its own MAC.

Figure 2C:
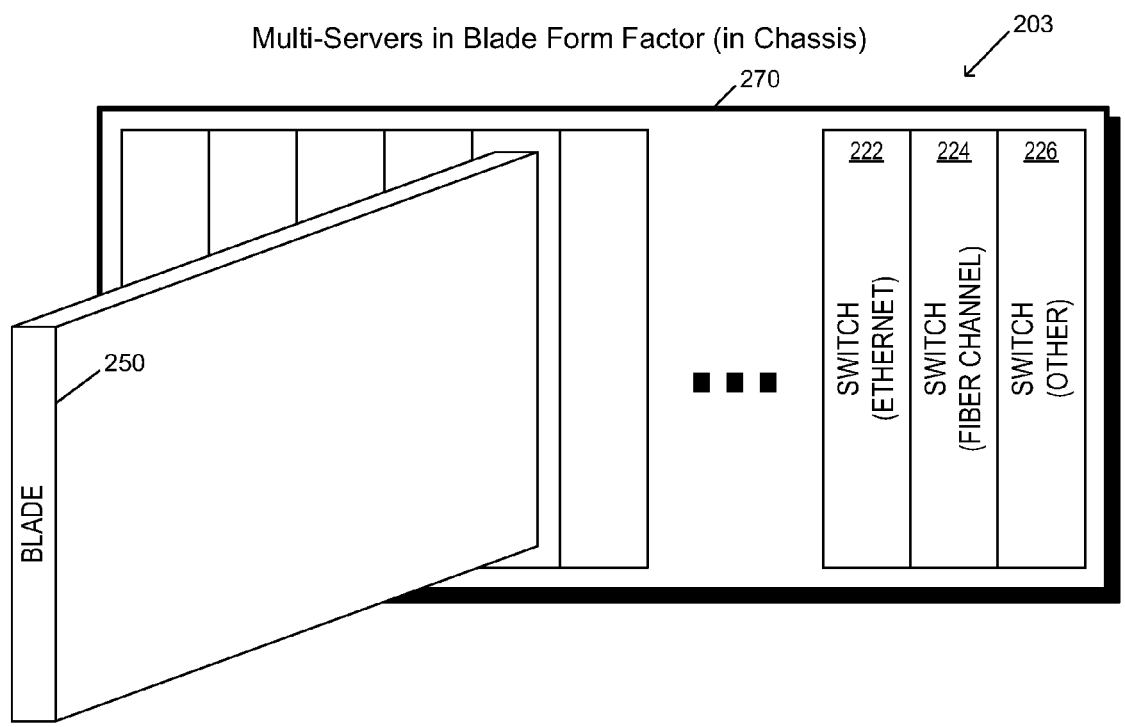
FIG. 2C is a block diagram of a multi-server blade chassis containing switches for three different fabrics.

Referring now to FIG. 2C, a diagram is shown of a blade environment 203. More specifically, a blade chassis 270 is shown having multiple blade servers 250 installed in it. In addition, to allow the servers 250 to communicate with each other, and to other networks, blade switches 222, 224, 226 are also installed in the chassis. What should be appreciated by one skilled in the art is that within a blade environment, to allow blade servers 250 to communicate to other networks, a blade switch is installed into the chassis 270 for each network that one of the blade servers 250 desires to communicate with. Alternatively, pass-thru cabling might be provided to pass network connections from the blade servers 250 to external switches.

Attention is now directed to FIGS. 3-20. These FIGS., and the accompanying text, will describe an invention which allows multiple root complexes (or processing complexes), whether standalone, rack mounted, or blade, to share I/O devices or controllers, such that each root complex does not have to have its own controller for each network or fabric to which it is attached. The invention will utilize a recently developed protocol known as PCI Express, but one skilled in the art will appreciate that although embodiments of the present invention will be described within the context of PCI Express, a number of alternative, or yet to be developed load/store protocols might be used without departing from the spirit and scope of the present invention.

By way of background, Peripheral Component Interconnect (PCI) was developed in the early 1990's by Intel Corporation as a general I/O architecture to transfer data and instructions faster than the ISA architecture of the time. PCI has gone thru several improvements since that time, with the latest proposal being PCI Express. In a nutshell, PCI Express is a replacement of the PCI and PCI-X bus specification to provide platforms with much greater performance, while using a much lower pin count (Note: PCI and PCI-X are parallel bus architectures, PCI Express is a serial architecture). A complete discussion of PCI Express is beyond the scope of this specification, but a thorough background and description can be found in the following books which are incorporated herein by reference for all purposes: Introduction to PCI Express, A Hardware and Software Developer's Guide, by Adam Wilen, Justin Schade, Ron Thornburg; The Complete PCI Express Reference, Design Insights for Hardware and Software Developers, by Edward Solari and Brad Congdon; and PCI Express System Architecture, by Ravi Budruk, Don Anderson, Tom Shanley In addition, the PCI Express specification is managed and disseminated through the Special Interest Group (SIG) for PCI.

Figure 3:
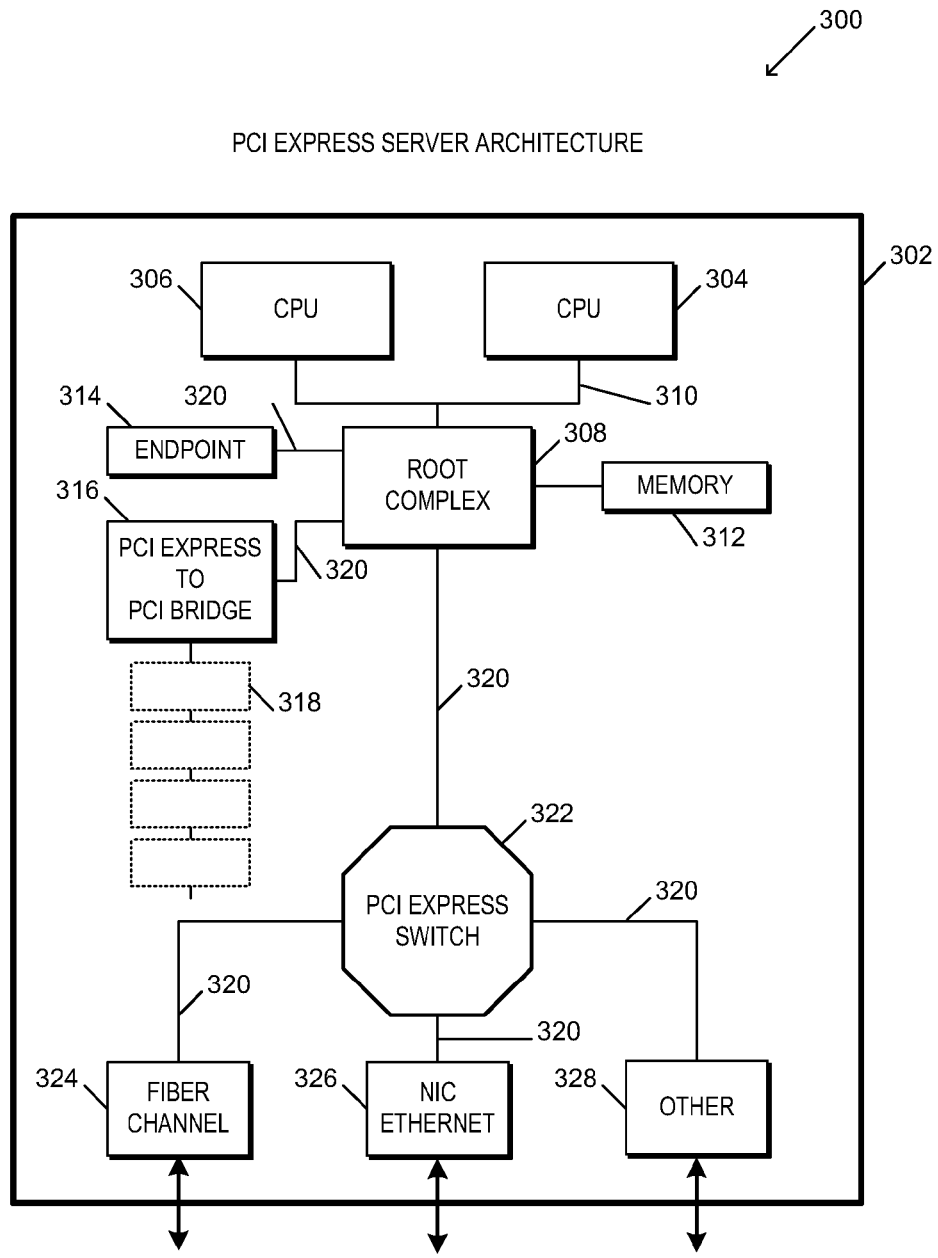
FIG. 3 is an architectural diagram of a computer server utilizing a PCI Express fabric to communicate to dedicated input/output (I/O) endpoint devices.

Referring now to FIG. 3, a diagram 300 is shown illustrating a server 300 utilizing the proposed PCI Express bus for device communication. The server 300 includes CPU's 304, 306 coupled to a root complex 308 via a host bus 310. The root complex 308 is coupled to memory 312, to an endpoint 314 via PCI Express bus 320, to a PCI Express to PCI Bridge 316 via a second PCI Express bus 320, and to a PCI Express Switch 322 via a third PCI Express bus 320. The PCI Express to PCI Bridge 316 allows the root complex to communicate with legacy PCI devices 318, such as sound cards, graphics cards, storage controllers (SCSI, Fiber Channel, SATA), network controllers (Ethernet), Firewire, USB, etc. The PCI Express switch 322 allows the root complex 308 to communicate with multiple PCI Express endpoint devices such as a Fiber Channel controller 324, a network interface controller 326 and an Other controller 328. Within PCI Express, an endpoint is defined as any component that is downstream of the root complex or switch and contains one device with one to eight functions. The inventors understand this to include devices such as I/O Controllers, but also includes CPU's that are themselves front ends to controller devices (e.g., xScale RAID controllers).

The server 300, may be either a standalone server, a rack mount server, or a blade server, as shown above with respect to FIGS. 2A-C, but includes the PCI Express bus for communication between the root complex 308, and all downstream interface controllers 324, 326, 328. What should be appreciated at this point is that the server 300 as shown still requires dedicated I/O controllers 324, 326, 328 to allow each server 300 to communicate to network fabrics such as Ethernet, Fiber Channel, etc.

Figure 4:
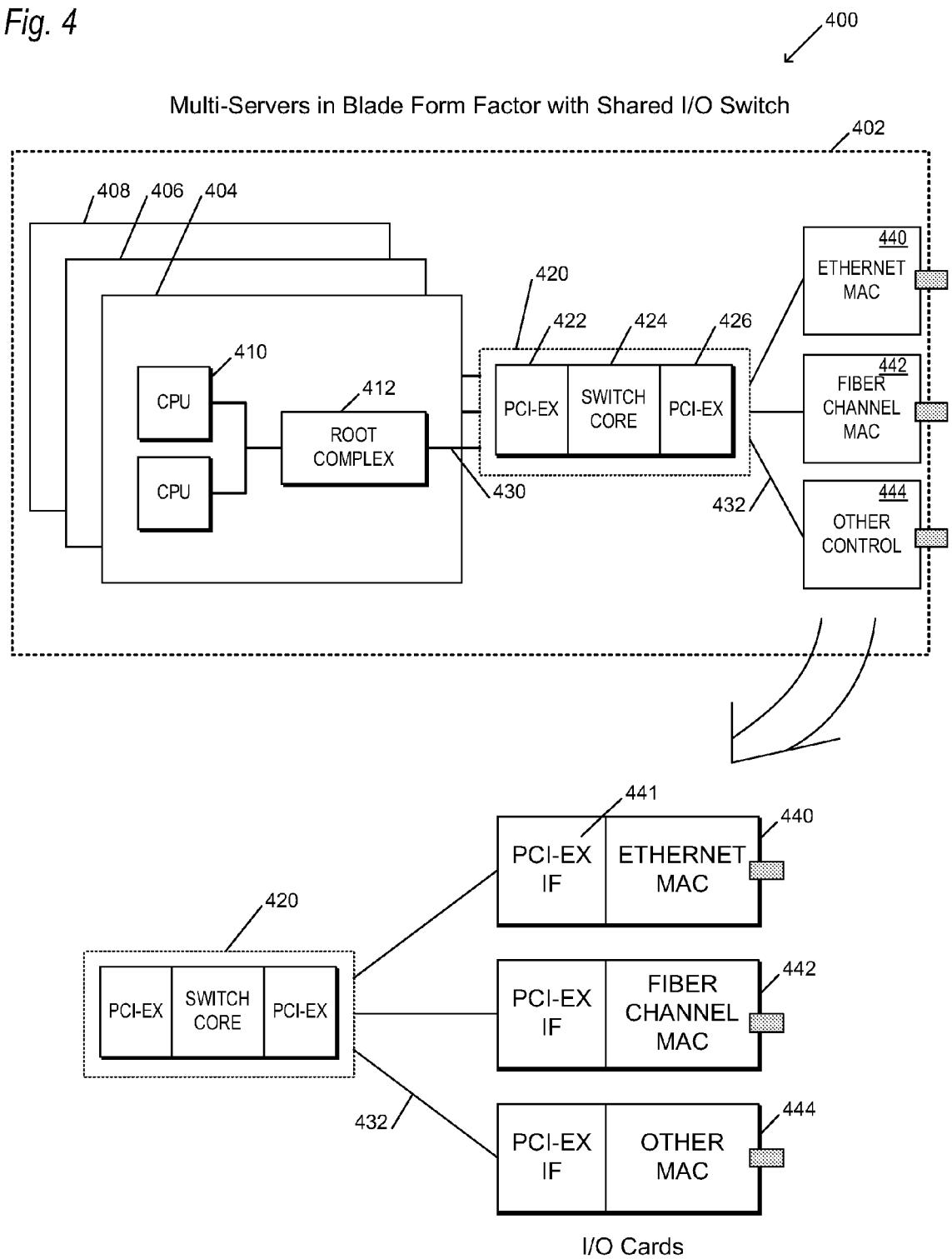
FIG. 4 is an architectural diagram of multiple blade computer servers sharing three different I/O endpoints according to the present invention.

Referring now to FIG. 4, a block diagram is shown of a multi-server environment 400 which incorporates shared I/O innovations of the present invention. More specifically three blade servers 404, 406, 408 are shown, each having one or more CPU's 410 coupled to their root complex 412. On the south side of the root complex 412 of each of the servers 404, 406, 408 are PCI Express links 430. The PCI Express links 430 are all coupled to a shared I/O switch 420 according to the present invention. On the south side of the shared I/O switch 420 are a number of PCI Express links 432 (defined below) coupled directly to shared I/O devices 440, 442, 444. In one embodiment, the shared I/O devices include a shared Ethernet controller 440, a shared Fiber Channel controller 442, and a shared Other controller 444. The south side of each of these controllers are connected to their associated network or fabric.

As will be further described below, none of the servers 404, 406, 408 have their own dedicated I/O controllers. Rather, the south side of their root complexes 412 are coupled directly to the shared I/O switch 420 which then allows each of the servers 404, 406, 408 to communicate with the shared I/O controllers 440, 442, 444 while still using the PCI Express load/store fabric. As more particularly shown, the shared I/O switch 420 includes one or more PCI Express links 430 on its north side, a switch core 424 for processing PCI Express data and instructions, and one or more PCI Express+ links 432 on its south side for connecting to downstream PCI Express devices (such as network controllers, data storage controllers), and even another shared I/O switch 420 for cascading of PCI Express+ links. Further, each of the downstream devices 440, 442, 444 include a PCI Express+ interface 441, and Media Access Control (MAC). What should be appreciated by one skilled in the art, when comparing FIG. 4 to that shown in FIG. 2B, is that the three shared I/O devices 440, 442, 444 allow all three servers 404, 406, 408 to connect to the Ethernet, Fiber Channel, and Other networks, whereas the solution of FIG. 2B requires nine controllers (three for each server) and three switches (one for each network type). For a complete description of the shared I/O switch 420, reference is made to Appendix A which is attached hereto and incorporated by reference for all purposes.

Figure 5:
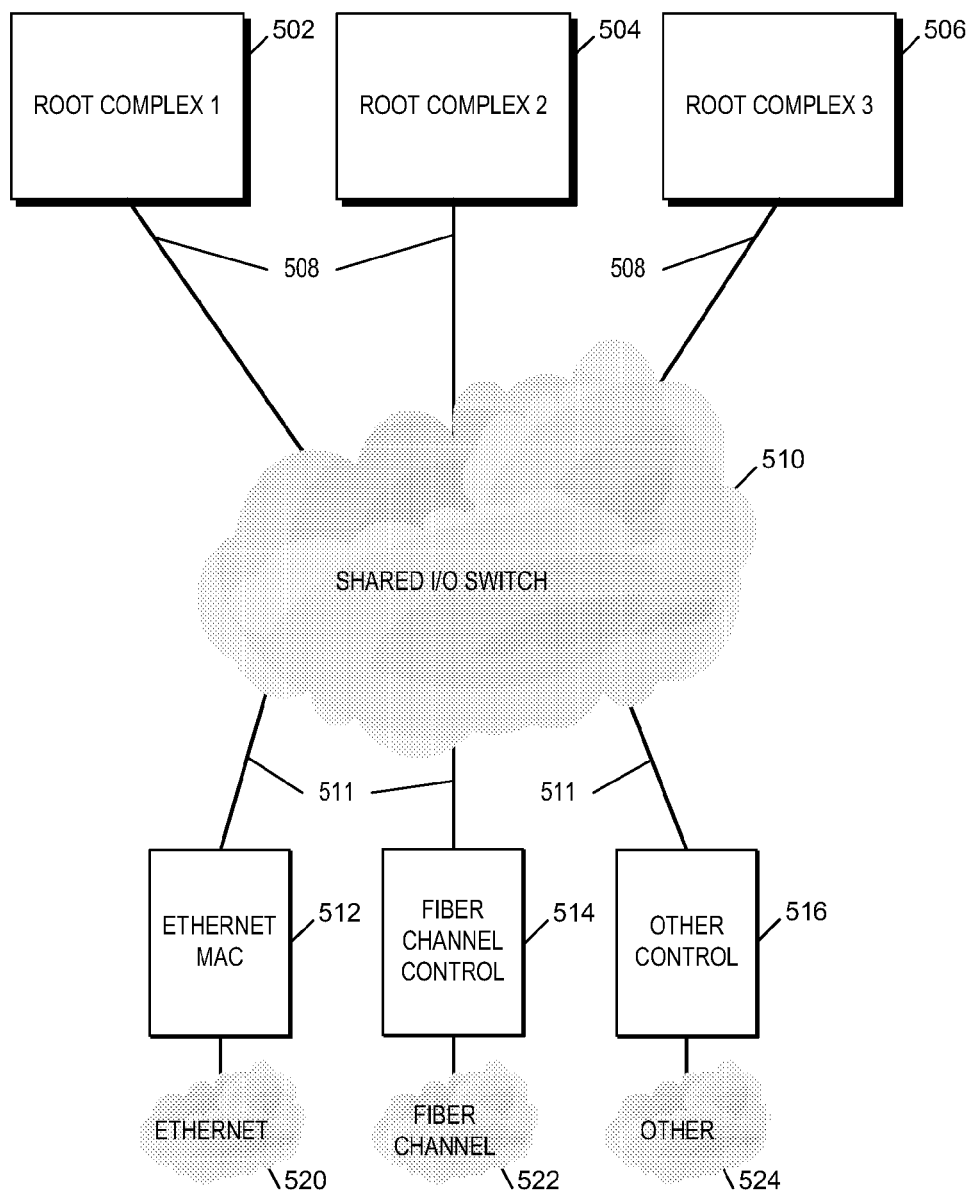
FIG. 5 is an architectural diagram illustrating three root complexes sharing three different I/O endpoint devices through a shared I/O switch according to the present invention.

Referring now to FIG. 5, a block diagram of a shared I/O environment 500 is shown which incorporates the novel aspects of the present invention. More specifically, the environment 500 includes root complexes 502, 504, 506 coupled to a shared I/O switch 510 via one or more PCI Express links 508. And, for ease of illustration, the root complexes discussed here below are inclusive of one or more processing complexes, but may not include their own I/O. As mentioned above, reference to PCI Express is for illustration purposes only. Alternative embodiments include other load/store fabrics whether serial or parallel.

The shared I/O switch 510 is coupled to a shared Ethernet controller 512, a shared Fiber Channel controller 514, and a shared Other controller 516. The shared Ethernet controller is attached to an Ethernet fabric 520. The shared Fiber Channel controller 514 is attached to a Fiber Channel fabric 522. The shared Other controller 516 is attached to an Other fabric 524. In operation, any of the root complexes 502, 504, 506 may communicate with any of the fabrics 520, 522, 524 via the shared I/O switch 510 and the shared I/O controllers 512, 514, 516. Specifics of how this is accomplished will now be described with reference to FIGS. 6-20.

Figure 6:
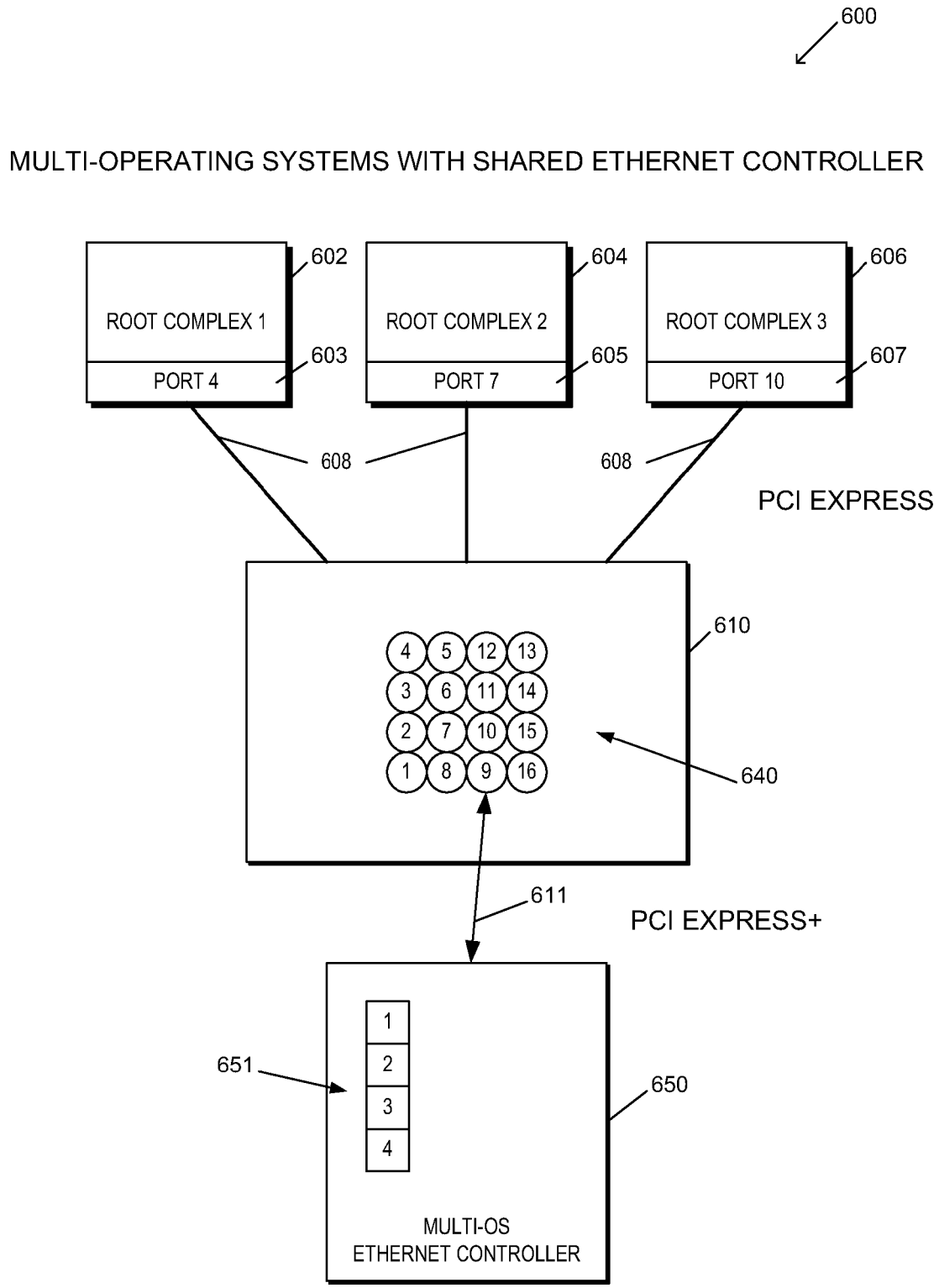
FIG. 6 is an architectural diagram illustrating three root complexes sharing a multi-OS Ethernet Controller through a multi-port shared I/O switch according to the present invention.

Referring to FIG. 6, a block diagram of a computing environment 600 is shown illustrating a shared I/O embodiment according to the present invention. The environment includes three root complexes illustrated by root complexes 602, 604, 606. These complexes 602, 604, 606 may all have the same CPU architecture executing the same operating system, or alternatively, be of different architecture executing different operating systems. What they have in common is that they each have an interface to a load/store fabric such as PCI Express. For purposes of illustration, the complexes 602, 604, 606 each have a port 603, 605, 607, respectively which interfaces them to PCI Express.

Each of these ports 603, 605, 607 are coupled to one of 16 ports 640 within a shared I/O switch 610 according to the present invention. In one embodiment, the switch 610 provides 16 ports which support the PCI Express fabric, although other port configurations are contemplated. One skilled in the art will appreciate that these ports may be of different speeds (e.g., 2.5 gigabits per second), and may support multiple lanes per link (e.g., x1, x2, x4, x8, x12, x16). For example, port 4 603 of root complex 1 602 may be coupled to port 4 of I/O switch 610, port 7 605 of root complex 2 604 may be coupled to port 11 of I/O switch 610, and port 10 607 of root complex 3 606 may be coupled to port 16 of switch 610.

On the downstream side, port 9 of shared I/O switch 610 may be coupled to a port on a shared I/O controller 650, such as an Ethernet controller that supports packets from one of N number of different root complexes (i.e., a multi-OS shared controller). Illustrated within shared I/O controller 650 are four OS resources 651 that may be independently supported. That is, shared I/O controller 650 is capable of transmitting, receiving, and processing packets from four distinct root complexes or OS Domains. An OS Domain, within the present context, is an operating system domain where the system memory and I/O devices for a particular CPU (or set of CPU's) are part of a single system memory map or operating system. In addition (or alternatively) an OS Domain consists of a processing complex, memory and I/O executing a single instance of an operating system, such as Windows, Linux, VxWorks, running on one or more CPU's. In one embodiment, the link between the shared I/O switch 610 and the shared I/O controller 650 utilizes the PCI Express fabric, but enhances the fabric to allow for identification of OS Domains, as will be further described below. The inventors refer to the enhanced fabric as PCI Express+611.

Figure 7:
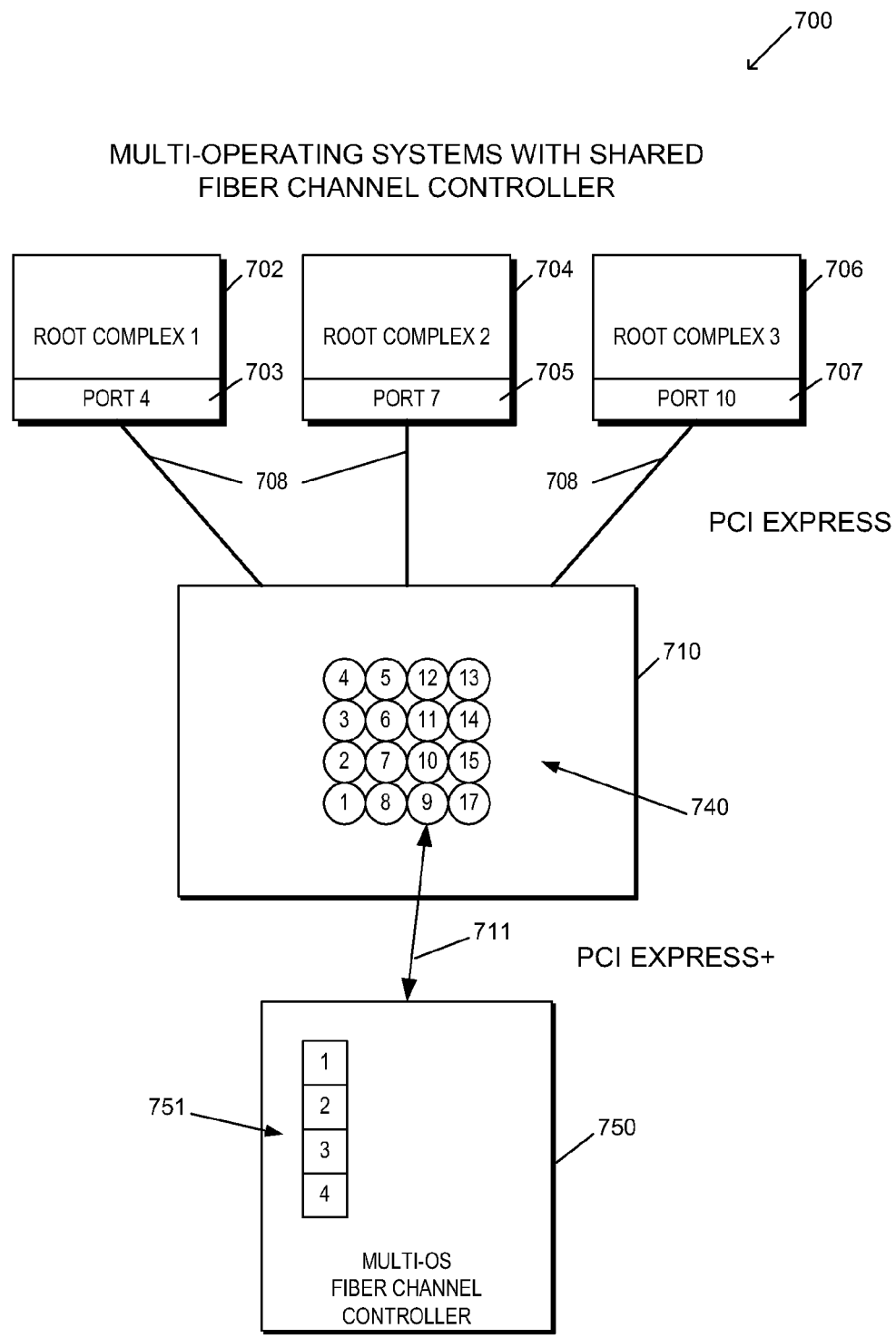
FIG. 7 is an architectural diagram illustrating three root complexes sharing a multi-OS Fiber Channel Controller through a multi-port shared I/O switch according to the present invention.

Referring now to FIG. 7, an architecture 700 is shown which illustrates an environment similar to that described above with reference to FIG. 6, the hundreds digit being replaced by a "7". However, in this instance, the three complexes 702, 704, 706 are coupled to a shared I/O Fiber Channel controller 750 through the shared I/O switch 710. In one embodiment, the shared I/O Fiber Channel controller 750 is capable of supporting up to four independent OS Domains 751. Additionally, each of the root complexes 702, 704, 706 maintain their one-to-one port coupling to the shared I/O switch 710, as in FIG. 6. That is, while other embodiments allow for a root complex to have multiple port attachments to the shared I/O switch 710, it is not necessary in the present embodiment. For example, the root complex 1 702 may communicate through its port 4 703 to multiple downstream I/O devices, such as the Ethernet controller 650, and the Fiber Channel controller 750. This allows root complexes 702, 704, 706 to communicate with any shared I/O controllers attached to the shared I/O switch 710 via a single PCI Express port 703, 705, 707.

Figure 8:
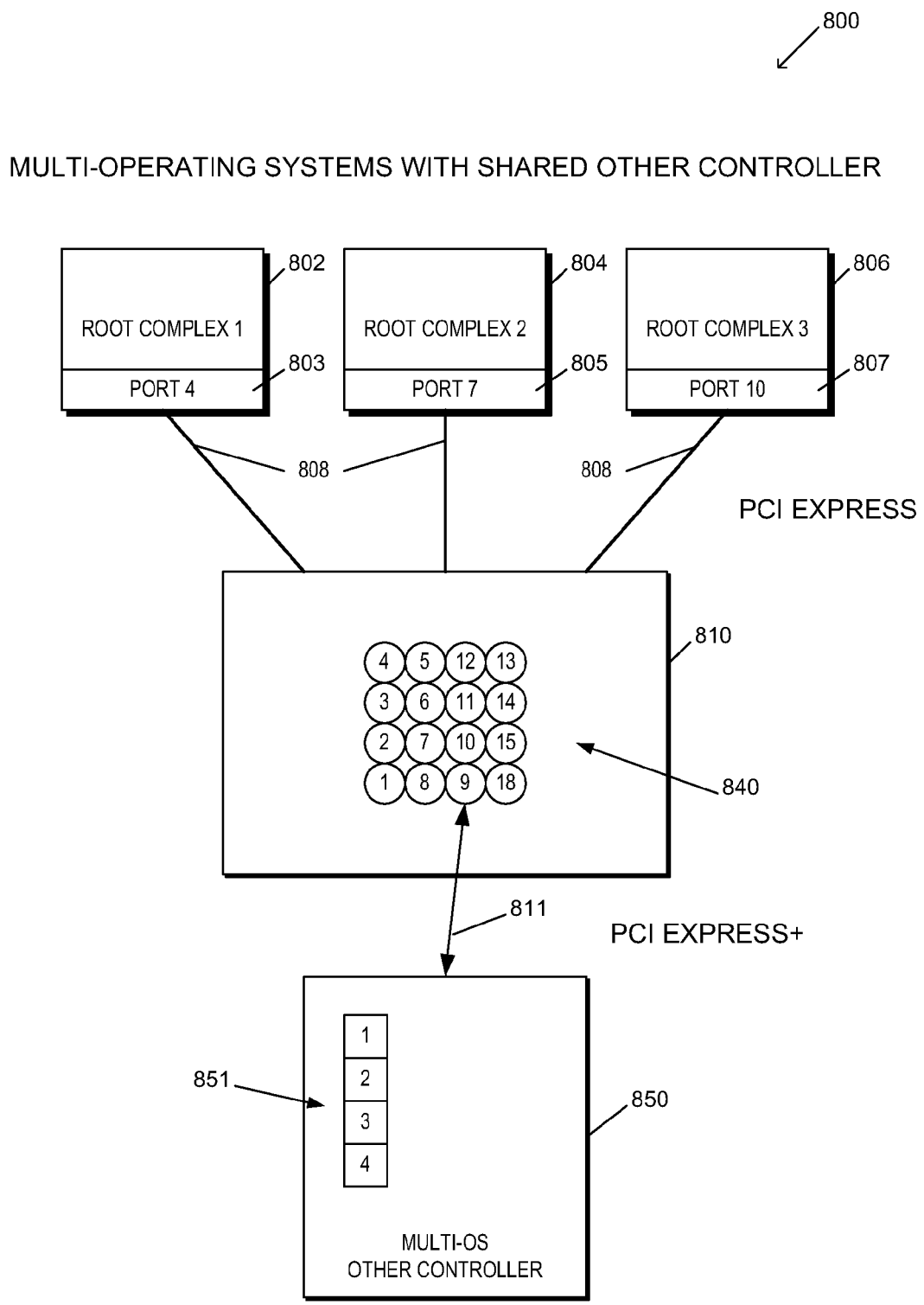
FIG. 8 is an architectural diagram illustrating three root complexes sharing a multi-OS Other Controller through a multi-port shared I/O switch according to the present invention.

Referring now to FIG. 8, an architecture 800 is shown which illustrates an environment similar to that described above with reference to FIGS. 6-7, the hundreds digit being replaced by an "8". However, in this instance, the three servers 802, 804, 806 are coupled to a shared I/O Other controller 850 (supporting four independent OS Domains 851) through the shared I/O switch 810. In one embodiment, the shared I/O Other controller may be a CPU designed for system management of the shared I/O switch. It is envisioned that such an I/O controller may be incorporated within the shared I/O switch 810. Moreover, it is possible to incorporate any of the three controllers shown in FIGS. 6-8 within the shared I/O switch without departing from the architecture of the present invention.

Figure 9:
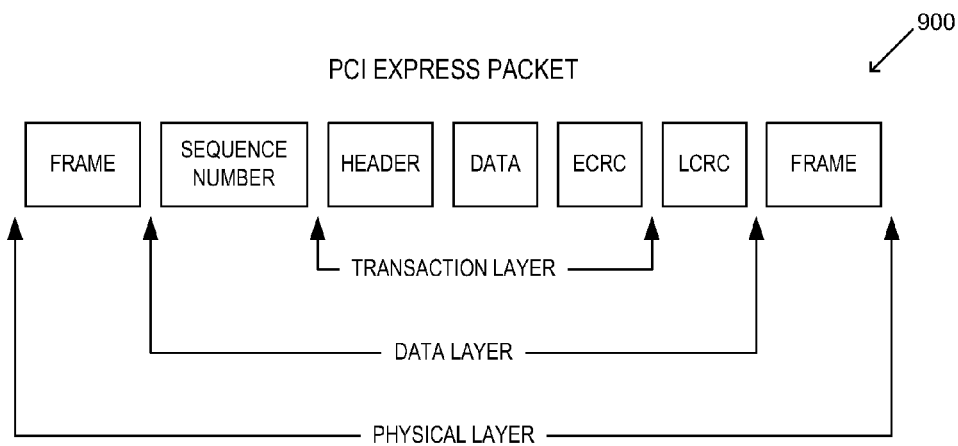
FIG. 9 is a block diagram of a prior art PCI Express Packet.

Referring now to FIG. 9, a block diagram of a PCI Express packet 900 is shown. The details of each of the blocks in the PCI Express packet 900 are thoroughly described in the PCI Express Base specification 1.0a published by www.pcisig.com, which is incorporated herein by reference for all purposes. Additional information may be found in the texts referenced above with respect to FIG. 2C.

In one embodiment, it is the packet structure of PCI Express, shown in FIG. 9, that is utilized between root complexes 602, 604, 606 and the shared I/O switch 610. However, the inventors contemplate the possibility that the enhancement described thus far as PCI Express+ 611 may also be used for communication between the root complexes 602, 604, 606 and the shared I/O switch 610, or directly between the root complexes 602-606 and downstream shared I/O endpoints. That is, the inventors conceive that the shared I/O switch 610 may eventually be incorporated into a root complex. In this context, the communication between the root complex and the incorporated switch may be PCI Express, while communication south of the incorporated switch may be PCI Express+. In addition, the inventors conceive that multiple processing complexes may be incorporated together (such as one or more independent processing cores within a single processor), where the processing cores are shared I/O aware (i.e., they communicate downstream to a shared I/O switch—whether incorporated or not using PCI Express+). The shared I/O switch then communicates to shared I/O endpoints using PCI Express+.

Figure 10:
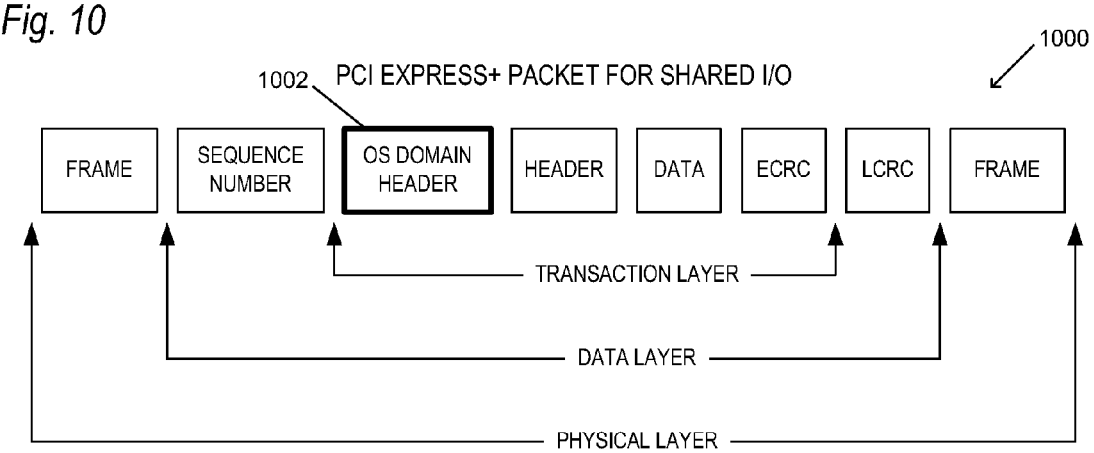
FIG. 10 is a block diagram of a PCI Express+ (Prime) packet for shared I/O according to the present invention.

Referring now to FIG. 10, a block diagram of an improved packet 1000, termed PCI Express+ by the inventors, is shown. More specifically, the PCI Express+ packet 1000 includes an OS Domain Header 1002 within a transaction layer of the packet 1000. Specifics of the OS Domain Header 1002 are provided below in FIG. 11 to which attention is now directed.

Figure 11:
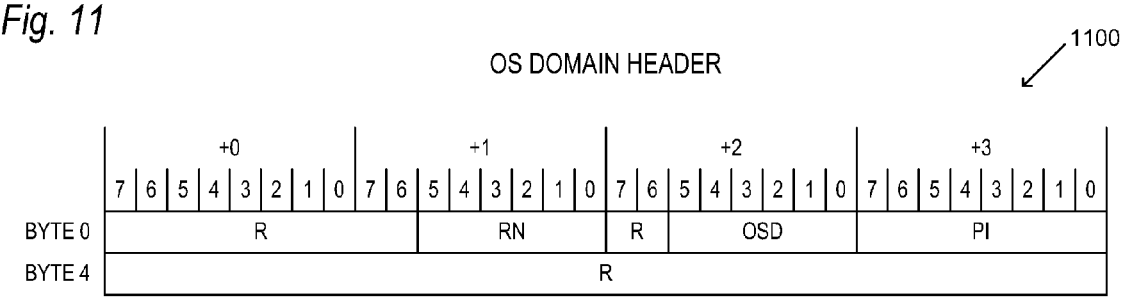
FIG. 11 is a detailed view of an OS (Operating System) Domain Header within the PCI Express+ packet of FIG. 10, according to the present invention.

FIG. 11 illustrates one embodiment of an OS Domain Header 1100 which is added to a PCI Express packet. The OS Domain Header 1100 is an eight byte field which includes five+ bytes that are Reserved, six bits allocated to identifying a Resource Number, one byte allocated as a Protocol ID field, and six bits as an OS Domain Number. The OS Domain Number is used to associate a packet with its originating or destination root complex. A six bit OS Domain Number field is thus capable of identifying 64 unique root complexes or OS Domains to an endpoint device such as a shared I/O controller. The inventors allocated 6-bits to the OS Domain Number field because they believed that in the foreseeable future, vendors would not want to build shared I/O controllers to support more than 64 unique OS Domains. However, one skilled in the art will appreciate that the present invention should not be restricted to the number of bits allocated within the OS Domain Header. Rather, what is important is that a means of associating a packet with its origin or destination OS Domain be established to allow the sharing or partitioning of I/O devices.

In an alternative embodiment, the OS Domain number is used to associate a downstream or upstream port with a PCI Express+ packet. That is, where a packet must traverse multiple links between its origination and destination, a different OS Domain number may exist for a given packet between each port pair (e.g., each link), while still uniquely identifying the packet so that it is ultimately associated with a root complex or OS Domain. In this context, the number of OS Domain numbers within a system may be a factorial combination of 64, dependent on the number of switches between an OS Domain and an endpoint, and the number of links within the fabric.

Additionally, within the OS Domain Header, are a number of reserved bits. It is conceived by the inventors that the reserved bits could have many uses. One such use would be for the reserved bits to track coherency of messages within its load/store fabric, although other uses are contemplated.

In one embodiment, the contents of the OS Domain Header are first established by the shared I/O switch 610 by embedding the port number in the shared I/O switch 610 that is coupled to the upstream root complex from which a packet originated, or for which a packet is intended, as the OS Domain Number. But, other means of associating packets with their origin/destination root complex are contemplated. One alternative is for each root complex that is coupled to the shared I/O switch 610 to be assigned a unique ID by the shared I/O switch 610 to be used as the OS Domain Number. Another alternative is for a root complex to be assigned a unique ID, either by the shared I/O switch 610, or by any other mechanism within or external to the root complex, which is then used in packet transfer to the shared I/O switch (or downstream shared I/O controllers).

In yet another embodiment, a two level table lookup is provided. More specifically, the OS Domain number is associated with a PCI bus hierarchy. The PCI bus hierarchy is then associated with a particular upstream or downstream port. In this embodiment, normal PCI discovery mechanisms are used to communicate with downstream shared I/O devices. And, the shared I/O switch is used to map particular PCI bus hierarchies to particular endpoints to keep multiple OS Domains from seeing more endpoints than have been provided for it by the shared I/O switch. All variations which embed an association of the packet with an upstream root complex or OS Domain are contemplated by the present invention.

In one embodiment, the OS Domain header may be the only additional information included within a PCI Express packet to form a PCI Express+ packet. Thus, further reference to a header, an OS header, a Domain header, or an OS Domain header should be read to include at least the OS Domain Number referenced above.

Figure 12:
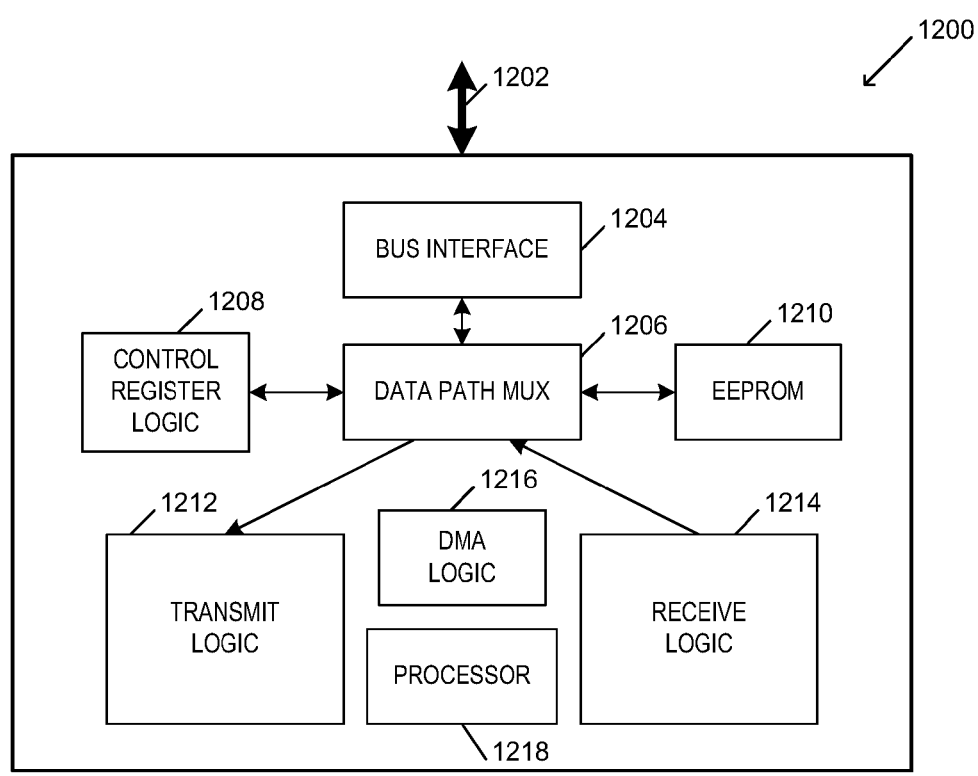
FIG. 12 is an architectural diagram of a prior art Ethernet Controller.

Referring now to FIG. 12, a high level block diagram is shown of a prior art non-shared Ethernet controller 1200. The non-shared Ethernet controller 1200 includes a bus interface 1204 for coupling to a bus 1202 (such as PCI, PCI-X, PCI Express, etc.). The bus interface 1204 is coupled to a data path multiplexer (MUX) 1206. The MUX 1206 is coupled to control register logic 1208, EEPROM 1210, transmit logic 1212, and receive logic 1214. Also included within the non-shared Ethernet controller 1200 are DMA logic 1216 and a processor 1218. One familiar with the logic within a non-shared Ethernet controller 1200 will appreciate that they include: 1) the bus interface 1204 compatible with whatever industry standard bus they support, such as those listed above; 2) a set of control registers 1208 which allow the controller 1200 to communicate with whatever server (or root complex, or OS Domain) to which it is directly attached; 3) and DMA logic 1216 which includes a DMA engine to allow it to move data to/from a memory subsystem that is associated with the root complex to which the non-shared Ethernet controller 1200 is attached.

Figure 13:
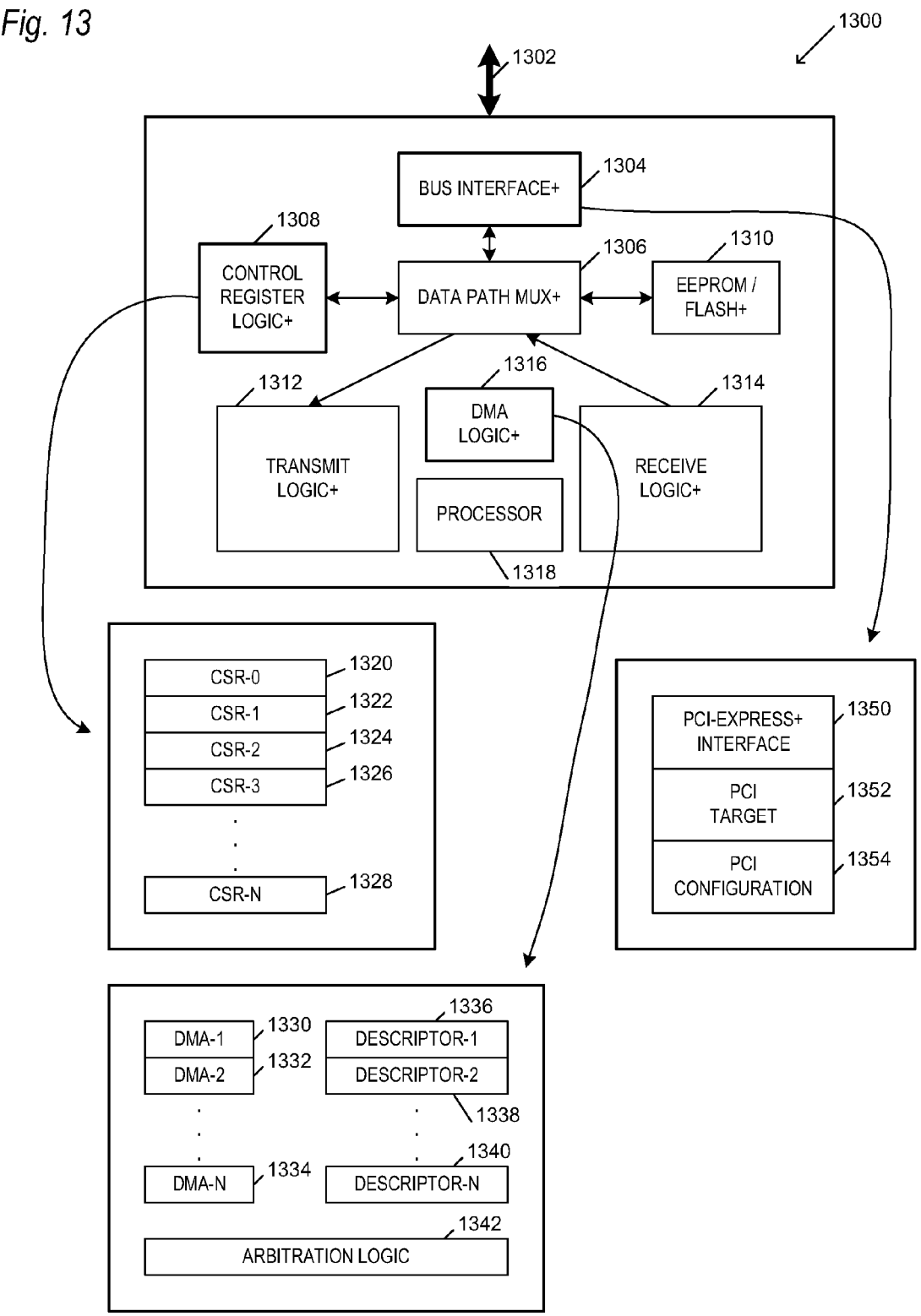
FIG. 13 is an architectural diagram of a shared Ethernet Controller according to the present invention.

Referring now to FIG. 13, a block diagram is provided of a shared Ethernet Controller 1300 according to the present invention. The shared Ethernet controller 1300 includes a bus interface+ 1304 for coupling the Ethernet controller 1300 to a shared load/store fabric 1302 such as the PCI Express+ fabric described above. The bus interface+ 1304 is coupled to a data path mux+ 1306. The data path mux+ 1306 is coupled to control register logic+ 1308, an EEPROM/Flash+ 1310, transmit logic+ 1312 and receive logic+ 1314. The shared Ethernet controller 1300 further includes DMA logic+ 1316 and a processor 1318.

More specifically, the bus interface+ 1304 includes: an interface 1350 to a shared I/O fabric such as PCI Express+; PCI Target logic 1352 such as a table which associates an OS Domain with a particular one of N number of operating system domain resources supported by the shared I/O controller 1300; and PCI configuration logic 1354, which in one embodiment, controls the association of the resources within the shared I/O controller 1300 with particular OS Domains. For example, the PCI configuration logic 1354 allows the shared Ethernet Controller 1300 to enumerate at reset, its abilities to support 1-N different OS Domains. In one embodiment, it provides a hard coded machine address to the shared I/O switch for each one of 1-N OS Domains that it can support. In an alternative embodiment, after alerting the shared I/O switch of the number of OS Domains it supports, it receives a machine address from the shared I/O switch for each OS Domain it will be mapped to. In either case, this allows each upstream OS Domain (or root complex) that is mapped to the shared I/O controller 1300 to view it as a controller having resources that are dedicated to its OS Domain. And, from the viewpoint of the OS Domain (or root complex), no changes to the OS Domain (operating system, driver for the controller, etc.) are required because the OS Domain will be communicating with the switch using its generic load/store protocol (e.g., PCI Express).

The control register logic+ 1308 includes a number of control register sets 1320-1328, each of which may be independently associated with a distinct OS Domain. For example, if the shared I/O controller 1300 supports just three OS Domains, then it might have control register sets 1320, 1322, 1324 where each control register set is associated with one of the three OS Domains. Thus, packets associated with a first OS Domain would be associated with control register set 1320, packets associated with a second OS Domain would be associated with control register set 1322, and packets associated with a third OS Domain would be associated with control register set 1324. Further, one skilled in the art will appreciate that while some control registers within a control register set (such as 1320) need to be duplicated within the shared I/O controller 1300 to allow multiple OS Domains to share the controller 1300, not all control registers require duplication. That is, some control registers must be duplicated for each OS Domain, others can be aliased, while others may be made accessible to each OS Domain. What is illustrated in FIG. 13 is N number of control register sets, where N is selectable by the vender of the shared I/O controller, to support as few, or as many independent OS Domains (or root complexes) as they desire.

The DMA logic+ 1316 includes N number of DMA engines 1330, 1332, 1334; N number of Descriptors 1336, 1338, 1340; and arbitration logic 1342 to arbitrate utilization of the N number of DMA engines 1330-1334. That is, within the context of a shared I/O controller 1300 supporting multiple OS Domains, depending on the number of OS Domains supported by the controller, performance is improved by providing multiple DMA engines 1330-1334, any of which may be utilized at any time by the controller 1300, for any particular packet transfer. Thus, there need not be a direct association between the number of OS Domains supported by the shared I/O controller 1300 and the number of DMA engines 1330-1334, or vice versa. Rather, a shared I/O controller manufacturer may support four OS Domains with just one DMA engine 1330, or alternatively may support three OS Domains with two DMA engines 1330, 1332, depending on the price/performance mix they desire.

Further, the arbitration logic 1342 may use an algorithm as simple as round-robin, or alternatively may weight processes differently, either utilizing the type of transaction as the weighting factor, or the OS Domain associated with the process as the weighting factor. Other arbitration algorithms may be used without departing from the scope of the present invention.

What is illustrated in FIG. 13 is one embodiment of a shared I/O controller, particularly an Ethernet controller, to allow processing of packets from multiple OS Domains (or root complexes) without regard to the architecture of the OS Domains, or the operating system executing in the OS Domains. As long as the load/store fabric 1302 provides an indication, or other information, which associates a packet to a particular OS domain, an implementation similar to that described in FIG. 13 will allow the distinct OS domains to be serviced by the shared I/O controller 1300. Further, although not described, the shared I/O controller 1300 has been particularly described with reference to Ethernet. It should be appreciated by one skilled in the art that similar modifications to existing non-shared I/O controllers, such as Fiber Channel, SATA, and Other controllers may be made to support multiple OS Domains, as contemplated by the present invention, and by the above description.

Figure 14:
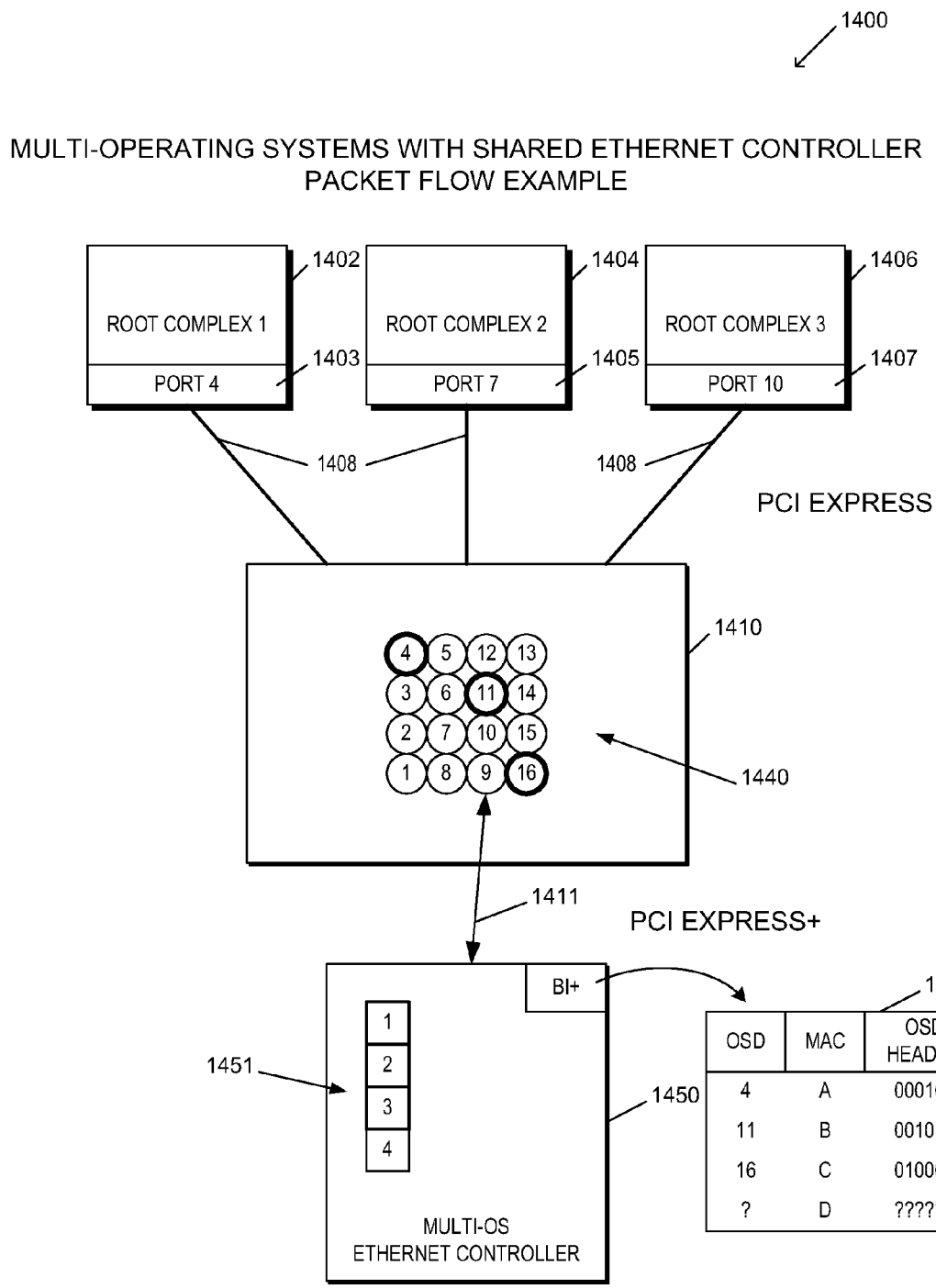
FIG. 14 is an architectural diagram illustrating packet flow from three root complexes to a shared multi-OS Ethernet Controller according to the present invention.

Referring now to FIG. 14, a block diagram is provided of an environment 1400 similar to that described above with respect to FIG. 6, the hundreds digit replaced with a "14". In addition, what is illustrated is a mapping within the shared I/O switch 1410 of three of the ports 1440, particularly ports 4, 11 and 16 to root complexes (or OS Domains) 1402, 1404, and 1406 respectively. Further, port 9 of the shared I/O switch 1410 is mapped to a shared I/O Ethernet controller 1450 which has resources 1451 to support four distinct OS Domains 1451. In this instance, since there are only three root complexes 1402, 1404, 1406 attached to the shared I/O switch 1410, only three of the resources 1451 are associated for utilization by the controller 1450.

More specifically, a bus interface+ 1452 is shown within the controller 1450 which includes a table for associating an OS Domain with a resource 1451. In one embodiment, the OS Header provided by the shared I/O switch 1410 is associated with one of the four resources 1451, where each resource includes a machine address. By associating one of N number of resources 1451 with an OS Domain, packets are examined by the bus interface+ 1452 and assigned to their resource based on the OS Header within the packets. Further, packets that have been processed by the shared I/O Ethernet controller 1450 are transmitted upstream by placing its associated OS Header within the PCI Express+ packet before transmitting it to the shared I/O switch 1410.

In one embodiment, when the multi-OS Ethernet controller 1450 initializes itself with the shared I/O switch 1410, it indicates to the shared I/O switch 1410 that it has resources to support four OS Domains (including having foUr MAC addresses). The shared I/O switch 1410 is aware that it will be binding the three root complexes 1402, 1404, 1406 to the shared I/O controller 1450, and therefore assigns three OS Domain numbers (of the 64 available to it), one associated with each of the root complexes 1402-1406, to each of the OS resources within the I/O controller 1450. The shared I/O controller 1450 receives the "mapping" of OS number to machine address and places that in its table 1452. Then, when transmitting packets to the switch, the shared I/O controller 1450 places the OS number corresponding to the packet in the OS Domain header of its PCI Express+ packet. Upon receipt, the shared I/O switch 1410 examines the OS Domain header to determine its PCI bus hierarchy. It uses its table which associates a PCI bus hierarchy with an upstream port to pass the packet to the appropriate root complex 1402-1406.

In an alternative embodiment, the multi-OS Ethernet controller 1450 provides OS Domain numbers to the shared I/O controller 1450 for each OS Domain that it can support (e.g., 1, 2, 3, or 4 in this illustration). The shared I/O controller 1450 then associates these OS Domain numbers with its port that is coupled to the multi-OS controller 1450. When the shared I/O switch 1410 sends/receives packets through this port, it then associates each upstream OS Domain that is mapped to the multi-OS controller 1450 to the OS Domain numbers provided by the multi-OS controller 1450 according to the PCI bus hierarchy for the packets. In one embodiment, the OS Domain numbers provided by the multi-OS controller 1450 index a table in the shared I/O switch 1410 which associates the downstream OS Domain number with the PCI bus hierarchy of a packet, and determines an upstream OS Domain number from the PCI bus hierarchy. The upstream OS Domain number is then used to identify the upstream port for transmission of the packet to the appropriate OS Domain. One skilled in the art will appreciate that in this embodiment, the OS Domain numbers between the switch 1410 and the controller 1450 is local to that link. The switch 1410 uses the OS Domain number on this link to associate packets with their upstream OS Domains to determine the upstream port coupled to the appropriate OS Domains. One mechanism for performing this association is a table lookup, but it should be appreciated that the present invention should not be limited to the particular means used.

While not yet called out, one skilled in the art will appreciate that for each PCI Express port (or PCI Express+ port) on the switch 1410, resources applicable to PCI bus hierarchies for each port (such as PCI2PCI bridges, buffering logic, etc.) should be presumed available for each port, capable of supporting each of the OS Domains on each port. In one embodiment, dedicated resources are provided for each port. In an alternative embodiment, virtual resources are provided for each port using shared resources within the switch 1410. Thus, in a 16 port switch 1410, 16 sets of resources are provided. Or alternatively, one or more sets of resources are provided that are virtually available to each of the ports.

Figure 15:
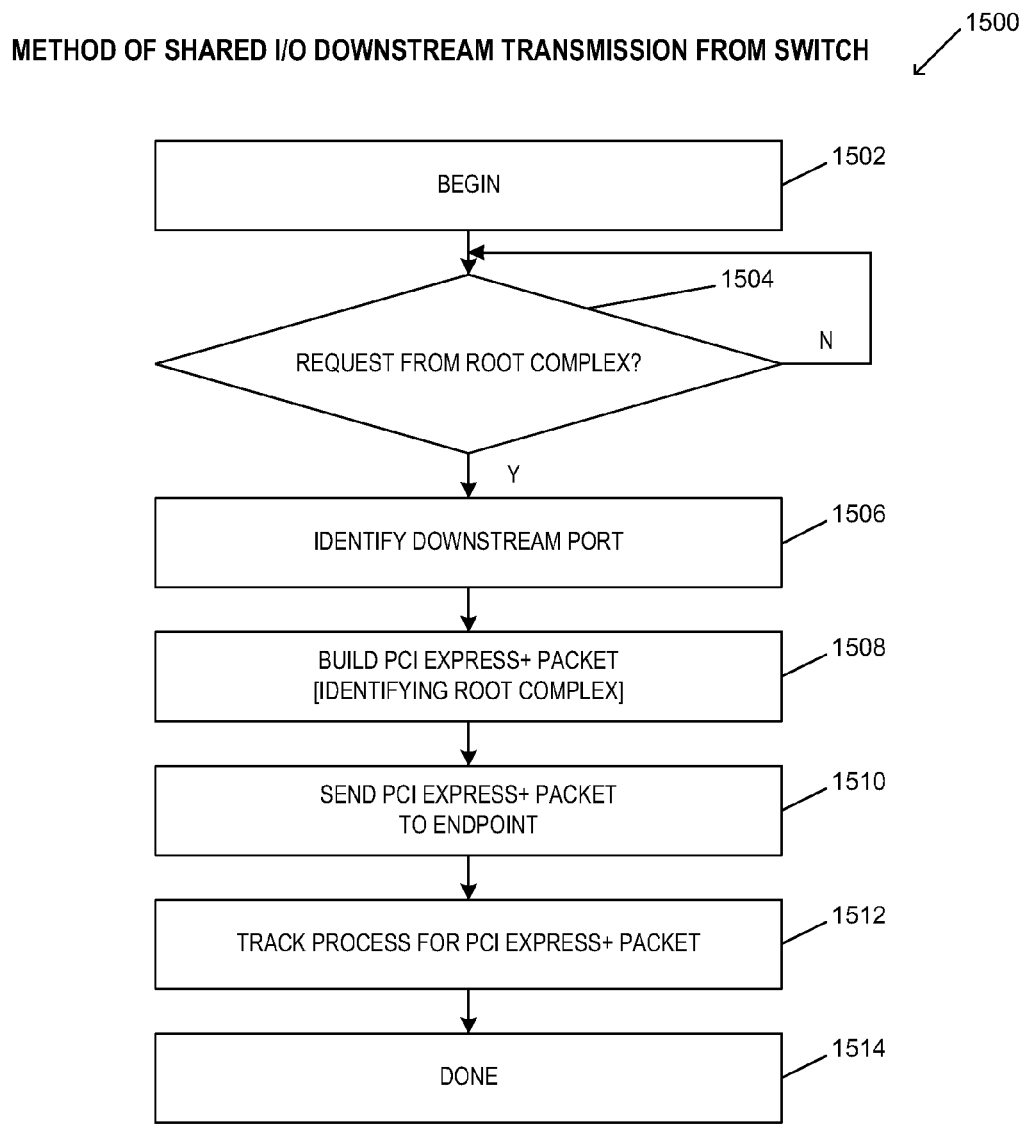
FIGS. 15 and 16 are flow charts illustrating a method of sharing an I/O endpoint device according to the present invention, from the viewpoint of a shared I/O switch looking at a root complex, and an endpoint device, respectively.

Referring now to FIG. 15, a flow chart 1500 is provided to illustrate transmission of a packet received by the shared I/O switch of the present invention to an endpoint such as a shared I/O controller.

Flow begins at block 1502 and proceeds to decision block 1504.

At decision block 1504, a determination is made at the switch as to whether a request has been made from a root complex (or OS Domain). That is, does an upstream port within the shared I/O switch contain a packet to be transmitted downstream? If not, flow returns to decision block 1504. Otherwise, flow proceeds to block 1506.

At block 1506, the downstream port for the packet is identified using information within the packet. Flow then proceeds to block 1508.

At block 1508, the shared I/O aware packet is built. If PCI Express is the load/store fabric which is upstream, a PCI Express+ packet is built which includes an OS Header which associates the packet with the OS Domain of the packet (or at least with the upstream port associated with the packet). Flow then proceeds to block 1510.

At block 1510, the PCI Express+ packet is sent to the endpoint device, such as a shared I/O Ethernet controller. Flow then proceeds to block 1512.

At block 1512 a process for tracking the PCI Express+ packet is begun. That is, within a PCI Express load/store fabric, many packets require response tracking. This tracking is implemented in the shared I/O switch, for each OS Domain to which the port is responsible. Flow then proceeds to block 1514 where packet transmission is completed (from the perspective of the shared I/O switch).

Figure 16:
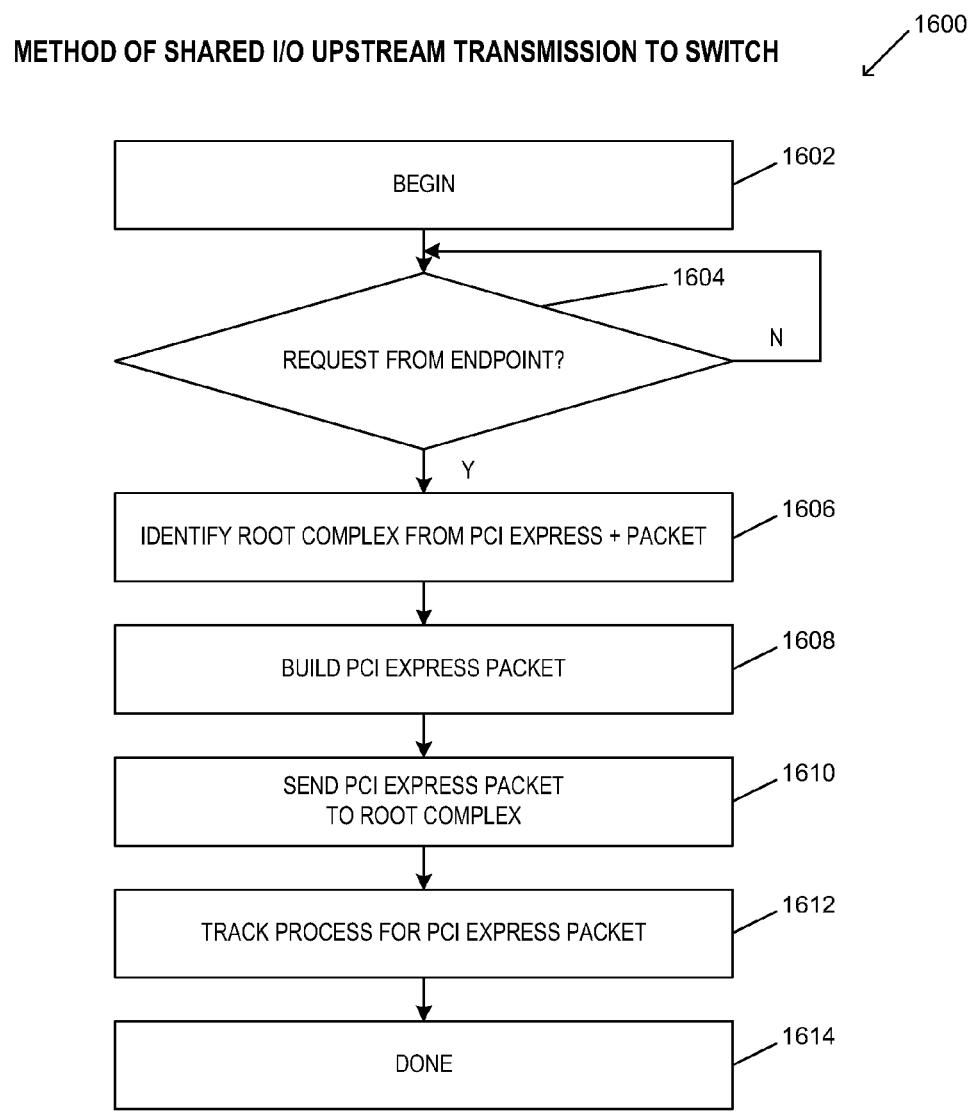

Referring now to FIG. 16, a flow chart 1600 is provided which illustrates transmission of a packet from an endpoint to the shared I/O switch according to the present invention. Flow begins at block 1602 and proceeds to decision block 1604.

At decision block 1604 a determination is made as to whether a packet has been received on a port within the shared I/O switch that is associated with an endpoint. If not, flow returns to decision block 1604. Otherwise, flow proceeds to block 1606.

At block 1606, the OS Header within the PCI Express+ packet is read to determine which OS Domain is associated with the packet. Flow then proceeds to block 1608.

At block 1608, a PCI Express packet is built for transmission on the upstream, non shared I/O aware, PCI Express link. Essentially, the OS Header is removed from the packet and the packet is sent to the port in the shared I/O switch that is associated with the packet (as identified in the OS Header). Flow then proceeds to block 1610.

At block 1610, the packet is transmitted to the OS Domain associated with the packet. Flow then proceeds to block 1612.

At block 1612 a process is begun, if necessary, to track the upstream packet transmission as described above with reference to block 1512. Flow then proceeds to block 1614 where the flow is completed.

Figure 17:
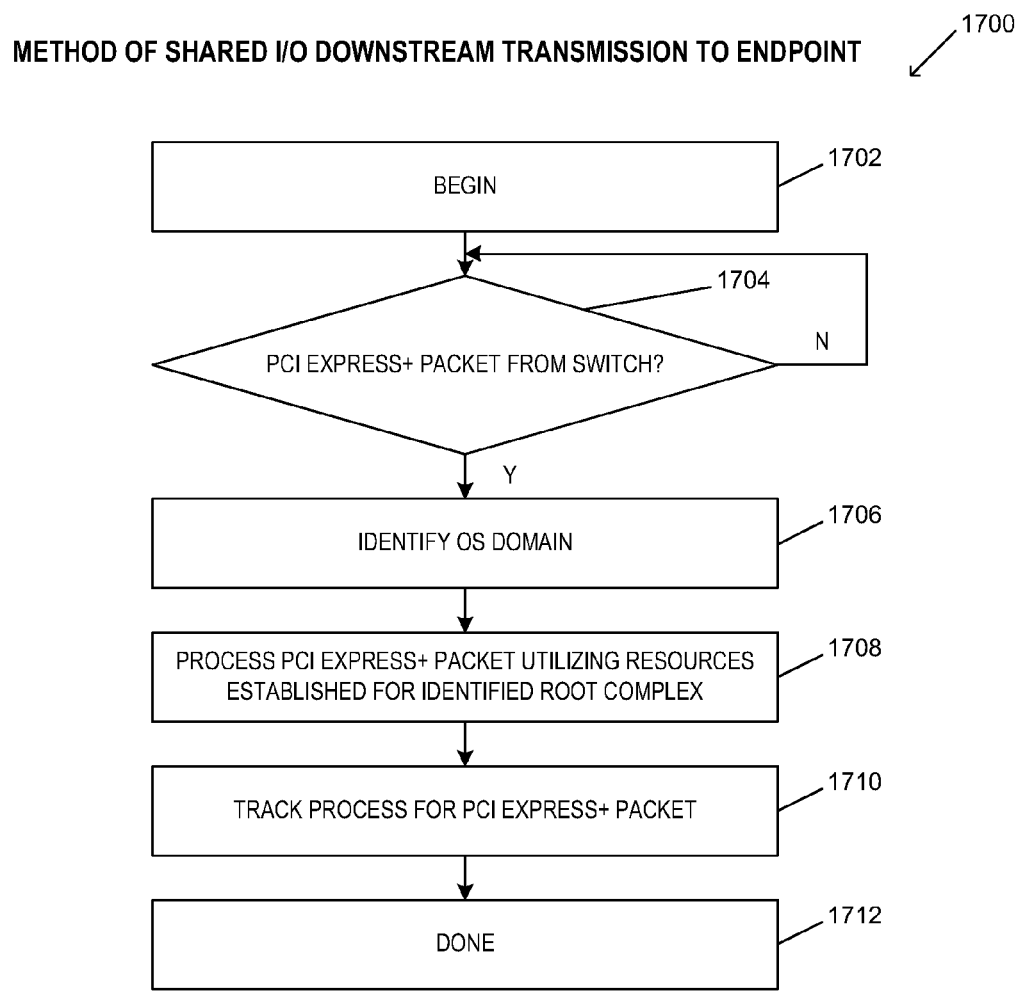
FIGS. 17 and 18 are flow charts illustrating a method of sharing an I/O endpoint device according to the present invention, from the viewpoint of the I/O endpoint device looking at a shared I/O switch.

Referring to FIG. 17, a flow chart 1700 is provided to illustrate a method of shared I/O according to the present invention from the viewpoint of a shared I/O controller receiving transmission of a shared I/O switch. Flow begins at block 1702 and proceeds to decision block 1704.

At decision block 1704 a determination is made as to whether a packet has been received from the shared I/O switch. If the load/store fabric is PCI Express, then the received packet will be a PCI Express+ packet. If no packet has been received, flow returns to decision block 1704. Otherwise, flow proceeds to block 1706.

At block 1706, the OS Domain (or upstream port associated with the packet) is determined. The determination is made using the OS Header within the PCI Express+ packet. Flow then proceeds to block 1708.

At block 1708, the packet is processed utilizing resources allocated to the OS domain associated with the received packet, as described above with reference to FIGS. 13-14. Flow then proceeds to block 1710.

At block 1710, a process is begun, if necessary to track the packet. As described with reference to block 1512, some packets within the PCI Express architecture require tracking, and ports are tasked with handling the tracking. Within the shared I/O domain on PCI Express+, tracking is provided, per OS Domain. Flow then proceeds to block 1712 where transmission is completed.

Figure 18:
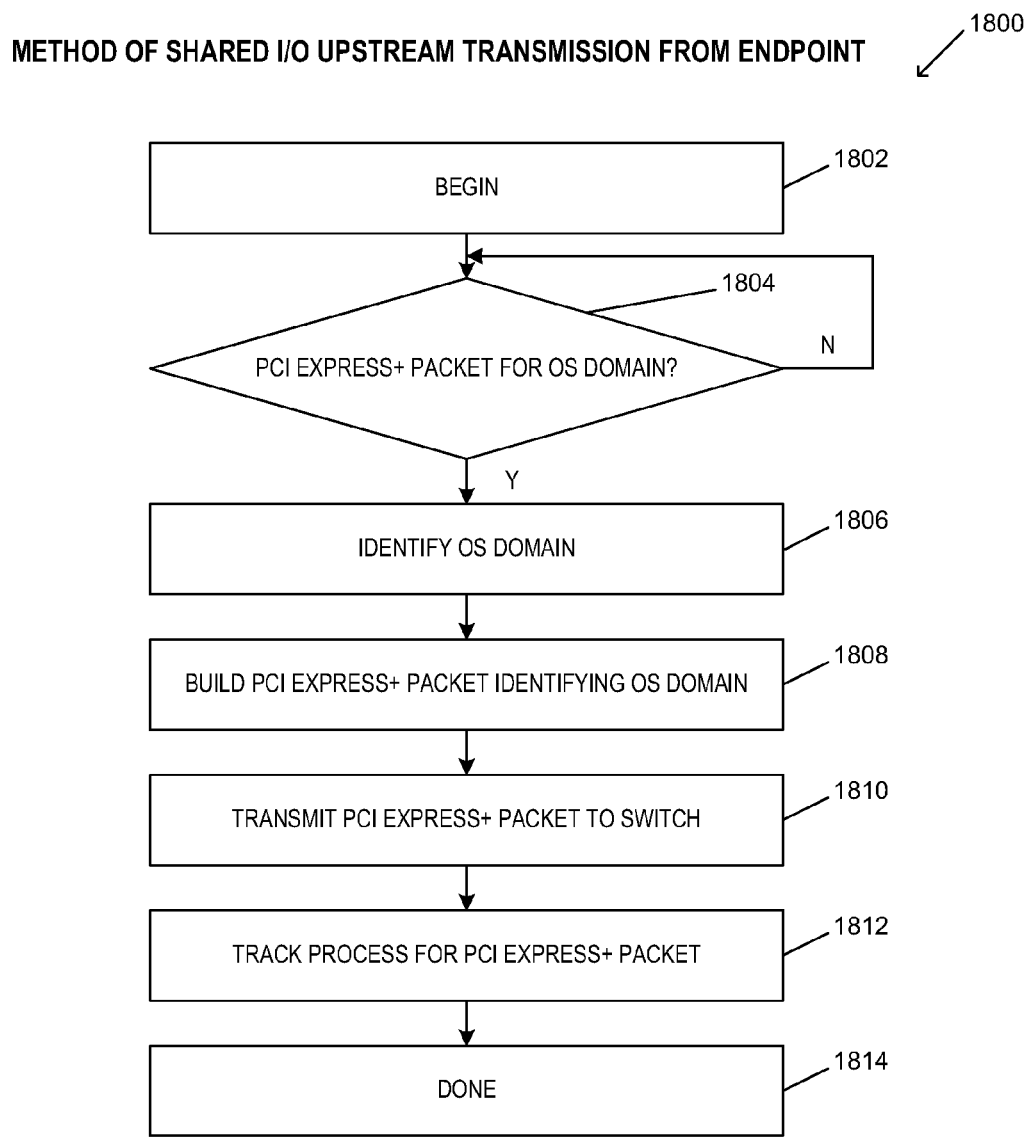

Referring now to FIG. 18, a flow chart 1800 is provided to illustrate transmission upstream from a shared I/O controller to a shared I/O switch. Flow begins at block 1802 and proceeds to decision block 1804.

At decision block 1804, a determination is made as to whether a packet is ready to be transmitted to the shared I/O switch (or other upstream device). If not, flow returns to decision block 1804. Otherwise, flow proceeds to block 1806.

At block 1806, the OS Domain (or upstream port) associated with the packet is determined. Flow then proceeds to block 1808.

At block 1808, a PCI Express+ packet is built which identifies the OS Domain (or upstream port) associated with the packet. Flow then proceeds to block 1810.

At block 1810, the PCI Express+ packet is transmitted to the shared I/O switch (or other upstream device). Flow then proceeds to block 1812.

At block 1812, tracking for the packet is performed. Flow then proceeds to block 1814 where the transmission is completed.

FIGS. 15-18 illustrate packet flow through the PCI Express+ fabric of the present invention from various perspectives. But, to further illustrate the shared I/O methodology of the present invention, attention is directed to FIG. 19.

Figure 19:
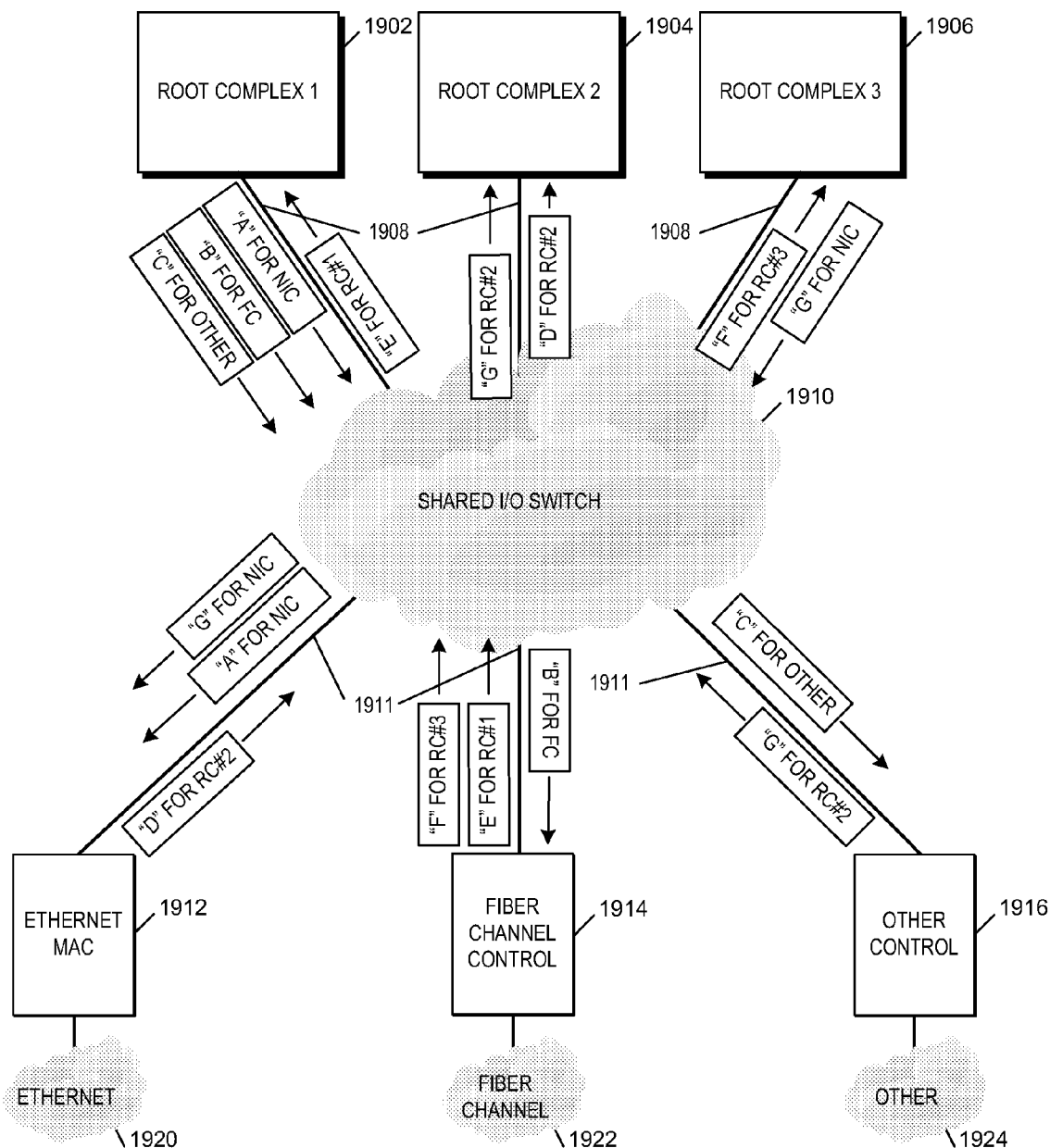
FIG. 19 is an architectural diagram illustrating packet flow from three root complexes to three different shared I/O fabrics through a shared I/O switch according to the present invention.

FIG. 19 illustrates an environment 1900 that includes a number of root complexes (or OS Domains) 1902, 1904, 1906 coupled to a shared I/O switch 1910 using a non-shared load/store fabric 1908 such as PCI Express. The shared I/O switch is coupled to three shared I/O controllers, including an Ethernet controller 1912, a Fiber Channel controller 1914 and an Other controller 1916. Each of these controllers 1912-1916 are coupled to their associated fabrics 1920, 1922, 1924, respectively.

In operation, three packets "A", "B", and "C" are transmitted by root complex 1 1902 to the shared I/O switch 1910 for downstream delivery. Packet "A" is to be transmitted to the Ethernet controller 1912, packet "B" is to be transmitted to the Fiber Channel controller 1914, and packet "C" is to be transmitted to the Other controller 1916. The shared I/O switch 1910 will receive these packets, one at a time. When it receives the packets, it will identify the downstream device using information within the packets and perform a table lookup to determine the downstream port associated with each of the packets. The shared I/O switch will then build PCI Express+"A", "B", and "C" packets which include OS Header information to associate the packets with root complex 1 1902 (or with the port in the shared I/O switch 1910 coupled to root complex 1 1902). The shared I/O switch 1910 will then place each of the packets at the port associated with their downstream device. Thus, packet "A" is placed on the port coupled to the Ethernet controller 1912, packet "B" is placed on the port coupled to the Fiber Channel controller 1914, and packet "C" is placed on the port coupled to the Other controller 1916. The packets are then transmitted to their respective controller.

At root complex 3 1906 a packet "G" is transmitted to the shared I/O switch 1910 for delivery to the Ethernet controller 1912. Upon receipt, the shared I/O switch 1910 builds a PCI Express+ packet for transmission to the Ethernet controller 1912 by placing an OS header within the PCI Express packet that associates the packet with root complex 3 1906 (or the switch port coupled to the root complex 3 1906). The shared I/O switch 1910 then transmits this packet to the Ethernet controller 1912.

The Ethernet controller 1912 has one packet "D" for transmission to root complex 2 1904. This packet is transmitted, with an OS Header to the shared I/O switch 1910. The I/O switch receives the "D" packet, examines the OS Header, and determines that the packet is destined for root complex 2 1904 (or the upstream port of the switch 1910 coupled to root complex 2 1904). The switch 1910 strips the OS Header off the "D" packet and transmits the "D" packet to root complex 2 1904 as a PCI Express packet.

The Fiber Channel controller 1914 has two packets for transmission. Packet "F" is destined for root complex 3 1906, and packet "E" is destined for root complex 1 1902. The shared I/O switch 1910 receives these packets, one at a time, over PCI Express+ link 1911. Upon receipt of each of these packets, the OS Header is examined to determine which upstream port, or root complex, is associated with each of the packets. The switch 1910 then builds non-shared PCI Express packets "F" and "E" for root complexes 3 1916, and 1 1902, respectively, and provides the packets to the ports coupled to root complexes 3 and 1 for transmission. The packets are then transmitted to those root complexes.

The Other controller 1916 has a packet "G" destined for root complex 2 1904. Packet "G" is transmitted to the shared I/O switch 1910 as a PCI Express+ packet, containing OS header information associated the packet with root complex 2 1904 (or the upstream port in the shared I/O switch coupled to root complex 2 1904). The shared I/O switch 1910 removes the OS header from packet "G" and places the packet on the port coupled to root complex 2 1904 for transmission. Packet "G" is then transmitted to root complex 2 1904.

The above discussion of FIG. 19 illustrates the novel features of the present invention that have been described with reference to FIGS. 3-18 by showing how a number of root complexes (or OS Domains) can share I/O endpoints within a load/store fabric by associating packets with their respective OS Domains. While the discussion above has been provided within the context of PCI Express, one skilled in the art will appreciate that any load/store fabric can be utilized without departing from the scope of the present invention.

Figure 20:
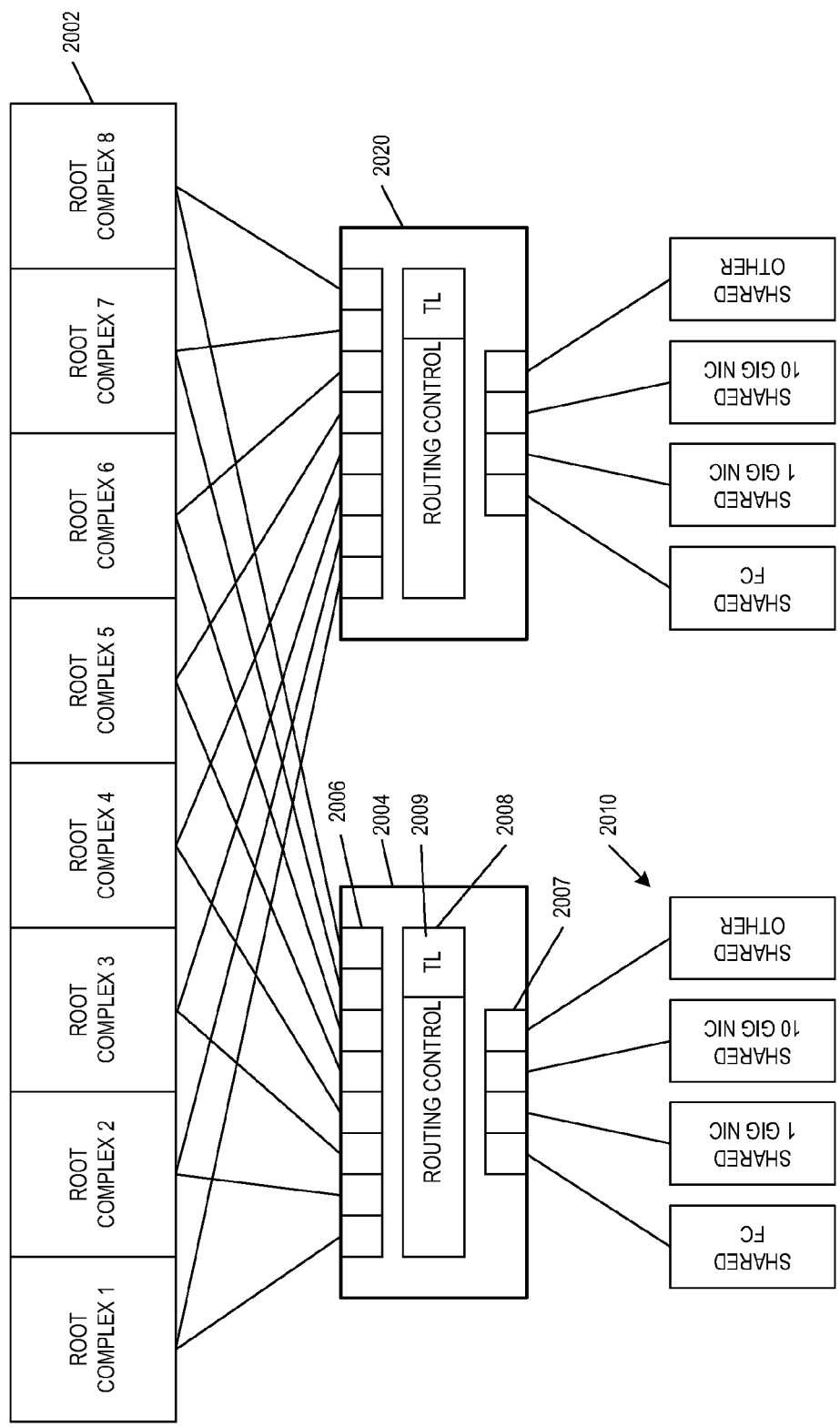
FIG. 20 is an architectural diagram of eight (8) root complexes each sharing four (4) endpoint devices, through a shared I/O switch according to the present invention, redundantly.

Referring now to FIG. 20, a block diagram 2000 is shown which illustrates eight root complexes 2002 which share four shared I/O controllers 2010 utilizing the features of the present invention. In one embodiment, the eight root complexes 2002 are coupled directly to eight upstream ports 2006 on shared I/O switch 2004. The shared I/O switch 2004 is also coupled to the shared I/O controllers 2010 via four downstream ports 2007. In one embodiment, the upstream ports 2006 are PCI Express ports, and the downstream ports 2007 are PCI Express+ ports, although other embodiments might utilize PCI Express+ ports for every port within the switch 2004. Routing Control logic 2008, along with table lookup 2009 is provided within the shared I/O switch 2004 to determine which ports packets should be transferred to.

Also shown in FIG. 20 is a second shared I/O switch 2020 which is identical to that of shared I/O switch 2004. Shared I/O switch 2020 is also coupled to each of the root complexes 2002 to provide redundancy of I/O for the root complexes 2002. That is, if a shared I/O controller 2010 coupled to the shared I/O switch 2004 goes down, the shared I/O switch 2020 can continue to service the root complexes 2002 using the shared I/O controllers that are attached to it.

While not particularly shown, one skilled in the art will appreciate that many alternative embodiments may be implemented which differ from the above description, while not departing from the scope of the invention as claimed. For example, the bulk of the above discussion has concerned itself with removing dedicated I/O from blade servers, and allowing multiple blade servers to share I/O devices though a load/store fabric interface on the blade servers. Such an implementation could easily be installed in rack servers, as well as pedestal servers. Further, blade servers according to the present invention could actually be installed in rack or pedestal servers as the processing complex, while coupling to other hardware typically within rack and pedestal servers such as power supplies, internal hard drives, etc. It is the separation of I/O from the processing complex, and the sharing or partitioning of I/O controllers by disparate complexes that is described herein.

Additionally, the above discussion has described the present invention within the context of three servers communicating with three shared I/O controllers. The choice of three servers was simply one for purposes of illustration. The present invention could be utilized in any environment that has at least two processing complexes (servers, CPU's, etc.) that require I/O, whether network, data storage, whatever. To share I/O, you need at least two processing complexes. But, to share I/O, you only need one shared I/O endpoint. Thus, the present invention envisions two or more processing complexes which share one or more I/O controllers.

Furthermore, the above discussion described the present invention within the context of three shared I/O controllers, each of which identified representative types of controllers. One skilled in the art will appreciate that many types of controllers are envisioned. One type, not mentioned above, includes a keyboard, mouse, and/or video controller (KVM). Such a KVM controller would allow blade servers such as those described above, to remove the KVM controller from their board while still allowing an interface to keyboards, video and mouse (or other input devices) from a switch console. That is, a number of blade servers could be plugged into a blade chassis. The blade chassis could incorporate a single KVM controller which could be selectably shared by each of the blade servers using the invention described above.

Also, by utilizing the mapping of OS Domain to I/O controller within the shared I/O switch, it is possible to use the switch to "partition" I/O resources, whether shared or not, to OS Domains. For example, given four OS Domains (A, B, C, D), and four I/O resources (1, 2, 3, 4), three of those resources might be non-shared (1, 2, 3), and one shared (4). Thus, the shared I/O switch could map or partition the fabric as: A-1, B-2, C-3/4, D-4. That is, OS Domain A utilizes resource 1; OS Domain B utilizes resource 2, OS Domain C utilizes resources 3 and 4; and OS Domain D utilizes (and shares) resource 4, all partitioned using the I/O switch of the present invention.

Further, the present invention has utilized a shared I/O switch to associate and route packets from root complexes to their associated endpoints. It is within the scope of the present invention to incorporate the features of the present invention within a root complex (or chipset) such that everything downstream of the root complex is shared I/O aware (e.g., PCI Express+). If this were the case, shared I/O controllers could be coupled directly to ports on a root complex, as long as the ports on the root complex provided shared I/O information to the I/O controllers, such as OS Domain information. What is important is that shared I/O endpoints be able to recognize and associate packets with origin or upstream OS Domains, whether or not a shared I/O switch is placed external to the root complexes, or resides within the root complexes themselves.

And, if the shared I/O switch were incorporated within the root complex, it is also possible to incorporate one or more I/O controllers (or other endpoints) into the root complex. This would allow a single root complex to support multiple upstream OS Domains while packaging everything necessary to talk to fabrics outside of the load/store domain (Ethernet, Fiber Channel, etc.) within the root complex. Further, if the upstream OS Domains were made shared I/O aware, it is also possible to couple the domains directly to the shared I/O controllers, all within the root complex.

And, it is envisioned that multiple shared I/O switches according to the present invention be cascaded to allow many variations of interconnecting root complexes with downstream I/O devices. In such a cascaded scenario, an OS Header may be global, or it might be local. That is, it is possible that a local ID be placed within an OS Header, the local ID particularly identifying a packet, within a given link (e.g., between a root complex and a switch, between a switch and a switch, and/or between a switch and an endpoint). So, a local ID may exist between a downstream shared I/O switch and an endpoint, while a different local ID may be used between an upstream shared I/O switch and the downstream shared I/O switch, and yet another local ID between an upstream shared I/O switch and a root complex. In this scenario, each of the switches would be responsible for mapping packets from one port to another, and rebuilding packets to appropriately identify the packets with their associating upstream/downstream port.

It is further envisioned that while a root complex within today's nomenclature, means a component that interfaces downstream devices (such as I/O) to a host bus that is associated with a single processing complex (and memory), it is possible in the future for the term root complex to be redefined such that it provides the interface between downstream endpoints, and multiple upstream processing complexes. That is, two or more CPU's might reside north of the root complex each of which execute their own operating system. Or, a single CPU might contain multiple processing cores, each executing its own operating system. In either of these contexts, the connection between the processing cores/complexes and the root complex might be shared I/O aware, or it might not. If it is, then the root complex would act like the shared I/O switch of the present invention to pass packets from multiple processing complexes to downstream shared I/O endpoints. Alternatively, if the processing complexes were not shared I/O aware, then the root complexes would add an association to packets, such as the OS header, so that downstream devices would be shared I/O aware, and could associate the packets with their originating processing complexes.

It is also envisioned that the addition of a header within a load/store fabric, as described above, could be encapsulated within another load/store fabric yet to be developed, or could be encapsulated, tunneled, or embedded within a channel based fabric such as Advanced Switching or All Ethernet. Regardless of the fabric used downstream from the OS Domain (or root complex), the inventors consider any utilization of the method of associating a shared I/O endpoint with an OS Domain to be within the context of their invention, as long as the shared I/O endpoint is considered to be within the load/store fabric of the OS Domain.

Although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. An apparatus for transferring data in a load/store fabric between a plurality of root complexes and a shared input/output (I/O) endpoint, the apparatus comprising:
an interface configured to receive a packet from at least one of the plurality root complexes, the packet including a header field for identifying the shared I/O endpoint for which the packet is destined, said interface coupled to the plurality of root complexes, wherein in lieu of including a controller within each of the root complexes for transferring data to the shared I/O endpoint, the plurality of root complexes are coupled to said interface to share the endpoint; and
circuitry configured to:
add an operating system domain (OSD) header field to the packet for identifying which one of the plurality of root complexes is associated with the packet; and
transfer the packet with the added OSD header field to the shared endpoint.

2. The apparatus as recited in claim 1 wherein each of said plurality of root complexes comprises an operating system domain (OSD).

3. The apparatus as recited in claim 2 wherein said operating system domain comprises:
a processing complex; and
a memory, coupled to said processing complex, for storing data utilized by said processing complex.

4. The apparatus as recited in claim 1 wherein at least one of said plurality of root complexes comprises a plurality of operating system domains.

5. The apparatus as recited in claim 4 wherein said plurality of operating system domains comprise:
a plurality of processing complexes, wherein each of said plurality of processing complexes are coupled to a memory for storing data utilized by each of said processing complexes.

6. The apparatus of claim 1 wherein the plurality of root complexes are configured to convey data according to a PCI Express protocol, and wherein said interface is configured to modify the conveyed data to include an operating system domain (OSD) identifier for identifying which one of the plurality of root complexes is associated with the packet.

7. The apparatus of claim 1 wherein the data comprises information which is desired to be transferred from the shared I/O endpoint to one of said plurality of root complexes.

8. The apparatus of claim 1 wherein the load/store fabric is hardware, software, or a combination of hardware and software that moves the data from one of said plurality of root complexes to the shared I/O endpoint.

9. The apparatus of claim 1 wherein the shared input/output (I/O) endpoint comprises a network interface controller (NIC).

10. The apparatus of claim 9 wherein said network interface controller is an Ethernet controller.

11. The apparatus of claim 1 wherein the shared input/output (I/O) endpoint comprises a Fiber Channel controller.

12. The apparatus of claim 1 wherein the shared input/output (I/O) endpoint comprises one of the following: a Fibre Channel controller, a SCSI controller, or a shared RAID controller.

13. The apparatus of claim 1 wherein the load/store fabric utilizes PCI Express.

14. The apparatus of claim 13 wherein said header field comprises:
a transaction layer packet (TLP) header; and
an optional data payload.

15. The apparatus of claim 14 wherein said TLP header comprises a plurality of fields, including a field identifying the shared I/O endpoint for which the packet is destined.

16. The apparatus of claim 1 wherein the circuitry is further configured to add an operating system domain (OSD) header field comprising an OSD Number field for identifying which one of the plurality of root complexes is associated with the packet.

17. The apparatus of claim 16 wherein said OSD Number field is global throughout the load/store fabric.

18. The apparatus of claim 16 wherein said OSD Number field is local to each link in the load/store fabric.

19. The apparatus of claim 16 wherein said OSD Number field specifies of the plurality of root complexes from which the packet originated.

20. The apparatus of claim 16 wherein said OSD Number field specifies one of a plurality of OS Domains from which the packet originated.

21. The apparatus of claim 20 wherein said OSD Number field is a six (6) bit field for designating up to 64 distinct OS Domains within a link in the load/store fabric.

22. The apparatus of claim 16 wherein said OSD Number field is a six (6) bit field for designating up to 64 distinct root complexes.

23. The apparatus of claim 1 wherein said load/store fabric is a serial load/store fabric.

24. An apparatus for transferring data in a load/store fabric between a plurality of root complexes and a shared input/output (I/O) endpoint, the apparatus comprising:
an interface configured to:
receive a PCI Express packet; and
be coupled to the root complexes, wherein in lieu of including a controller within each of the root complexes that is configured to communicate using a first protocol, each of the root complexes is coupled to share the endpoint via said interface in order to communicate using the first protocol; and
circuitry configured to:
add a plurality of bits to said packet, wherein said plurality of bits identify an operating system domain from which the PCI Express packet originated; and
transfer said packet with the added plurality of bits to the shared I/O endpoint.

25. The apparatus as recited in claim 24 wherein said operating system domain comprises a root complex.

26. The apparatus as recited in claim 24 wherein said operating system domain comprises:
a processing complex; and
a memory, coupled to said processing complex for storing data utilized by said processing complex.

27. The apparatus as recited in claim 24 wherein said operating system domain comprises a port within a shared I/O switch to which a root complex is coupled.

28. The apparatus as recited in claim 24 wherein said shared I/O endpoint comprises at least one of the following: a network interface controller, a Fibre Channel controller, a SCSI controller, or a RAID controller.

29. The apparatus as recited in claim 24 wherein said interface is configured to receive a PCI Express packet and add a plurality of bits for identifying which one of the plurality of root complexes is associated with the packet.

30. The apparatus as recited in claim 24 wherein said endpoint comprises a plurality of control register sets; and a plurality of direct memory access (DMA) engines.

31. A method for identifying a root complex of a plurality of root complexes for a packet within a load/store fabric to allow sharing of an input/output (I/O) endpoint by the plurality of root complexes, the method comprising:
providing an architecture for the packet;
providing an interface for use in processing packets transferred between the root complexes and said shared I/O endpoint;
coupling the interface to the root complexes, wherein in lieu of including a controller within each of the root complexes for communicating to the I/O endpoint, each of the root complexes is coupled to the interface to share the I/O endpoint;
providing, by a circuitry, a field for inclusion in the packet to identify the root complex for the packet; and;
wherein the shared input/output (I/O) endpoint utilizes the field provided in said step of providing a field to identify the root complex for the packet.

32. The method for identifying the root complex as recited in claim 31 wherein the root complex comprises a network computer server.

33. The method for identifying the root complex as recited in claim 32 wherein the network computer server is a blade server.

34. The method for identifying the root complex as recited in claim 31 wherein the root complex comprises an operating system domain.

35. The method for identifying the root complex as recited in claim 31 wherein the architecture in said step of providing an architecture conforms to a PCI Express System Architecture, and wherein the interface is configured to receive a PCI Express packet and add an operating system domain (OSD) identifier for identifying which one of the plurality of root complexes is associated with the packet.

36. The method for identifying the root complex as recited in claim 31 wherein the input/output (I/O) endpoint comprises a network interface controller.

37. The method for identifying the root complex as recited in claim 36 wherein the network interface controller is an Ethernet controller.

38. The method for identifying the root complex as recited in claim 31 wherein the input/output (I/O) endpoints comprises one of the following: a Fibre Channel controller, a SCSI controller, or a RAID controller.

39. An apparatus for transferring data in a load/store fabric between a plurality of root complexes and a shared input/output (I/O) endpoint, the apparatus comprising:
an interface configured to receive a PCI Express packet; and
circuitry configured to:
add a plurality of bits to said packet, wherein said plurality of bits identify an operating system domain from which the PCI Express packet originated; and
transfer said packet with the added plurality of bits to the shared I/O endpoint;
wherein an OS Domain header is attached to a PCI Express Packet to form a PCI Express+Packet, wherein said PCI Express+Packet is sent to an endpoint device, wherein said endpoint device is a shared I/O network interface controller;
wherein said shared I/O network interface controller, upon receipt of said PCI Express+Packet:
examines the OS Domain header to determine which operating system domain the PCI Express Packet originated from;
after determining which operating system domain the PCI Express Packet originated from, applies controller resources that are associated with that operating system domain;
wherein said controller resources comprise: a plurality of controller register sets; and a plurality of direct memory access (DMA) engines.

* * * * *